US011780708B2

(12) United States Patent
Jakes et al.

(10) Patent No.: US 11,780,708 B2
(45) Date of Patent: Oct. 10, 2023

(54) POWER MANAGEMENT OF A BATTERY OF A STAIR LIFT SYSTEM

(71) Applicant: ACORN MOBILITY SERVICES LIMITED, Bradford (GB)

(72) Inventors: John Stewart Jakes, Monte Carlo (MC); Keith Holdstock, Gloucestershire (GB)

(73) Assignee: ACORN MOBILITY SERVICES LIMITED, Bradford (GB)

(*) Notice: Subject to any disclaimer, the term of this patent is extended or adjusted under 35 U.S.C. 154(b) by 0 days.

(21) Appl. No.: 17/573,795

(22) Filed: Jan. 12, 2022

(65) Prior Publication Data

US 2022/0135376 A1 May 5, 2022

Related U.S. Application Data

(63) Continuation of application No. 15/763,688, filed as application No. PCT/GB2016/053031 on Sep. 29, 2016, now Pat. No. 11,254,541.

(30) Foreign Application Priority Data

Sep. 30, 2015 (GB) .................................. 1517307
Jun. 29, 2016 (GB) .................................. 1611312

(51) Int. Cl.
  *B66B 9/08* (2006.01)
  *B66B 1/30* (2006.01)
  (Continued)

(52) U.S. Cl.
  CPC ............ B66B 9/0853 (2013.01); B66B 1/302 (2013.01); B66B 9/08 (2013.01); B66B 9/0807 (2013.01);
  (Continued)

(58) Field of Classification Search
  CPC ......... B66B 9/0853; B66B 9/08; B66B 1/302; B66B 9/0807; B66B 9/193; B66B 11/0407; Y02B 50/00
  See application file for complete search history.

(56) References Cited

U.S. PATENT DOCUMENTS 4,904,916 A    2/1990  Gisske et al.
10,769,926 B1*  9/2020  Rogers ............... G08B 21/0461
(Continued)

FOREIGN PATENT DOCUMENTS

CN    102556778    7/2012
GB    2137589      10/1984
(Continued)

OTHER PUBLICATIONS

Invitation to Pay Additional Fees and, Where Applicable, Protest Fees for International Application No. PCT/GB2016/053031, dated Feb. 2, 2017.
(Continued)

*Primary Examiner* — Jeffrey Donels
(74) *Attorney, Agent, or Firm* — Jason H. Vick; Sheridan Ross, PC

(57) ABSTRACT

A lift system comprises a rail and a carriage assembly comprising a seat or platform for supporting a person to be conveyed along the rail, drive means arranged to engage the rail and controllable to drive the carriage assembly along the rail, energy storage means arranged to power the drive means, input means operable by a user to provide an input signal indicative of a desired movement of the carriage assembly along the rail, and control means arranged to receive the input signal and control the drive means in response to the input signal. The system includes charging means arranged to charge the energy storage means when the carriage assembly is at a first charging position on the rail. The control means is arranged to monitor at least one (Continued)

voltage characteristic of the energy storage means and/or at least one operational characteristic of the stair lift, and generate an alert signal in response to one or more of those characteristics, or a difference between one or more of those characteristics, fulfilling a defined criterion, criteria, condition, or conditions.

6 Claims, 11 Drawing Sheets

(51) Int. Cl.
 *B66B 9/193* (2006.01)
 *B66B 11/04* (2006.01)
(52) U.S. Cl.
 CPC ........... *B66B 9/193* (2013.01); *B66B 11/0407* (2013.01); *Y02B 50/00* (2013.01)

(56) References Cited

U.S. PATENT DOCUMENTS

| | | | | |
|---|---|---|---|---|
| 2008/0128213 | A1* | 6/2008 | Harris | B66B 9/0846 187/289 |
| 2012/0103225 | A1 | 5/2012 | Gubler | |
| 2012/0104818 | A1 | 5/2012 | Morris | |
| 2018/0072537 | A1* | 3/2018 | Pugh | B66B 9/0853 |
| 2019/0047825 | A1 | 2/2019 | Jakes et al. | |

FOREIGN PATENT DOCUMENTS

| | | | |
|---|---|---|---|
| GB | 2367807 | | 4/2002 |
| GB | 2397289 A | | 7/2004 |
| GB | 2510810 | | 8/2014 |
| GB | 2542488 A | * 3/2017 | ............... B66B 1/30 |
| JP | 05-162942 | | 6/1993 |
| JP | 08-677 | | 1/1996 |
| JP | 2009-083978 A | | 4/2009 |
| JP | 2012-184062 | | 9/2012 |

OTHER PUBLICATIONS

International Search Report for International Application No. PCT/GB2016/053031, dated Mar. 27, 2017.
Written Opinion for International Application No. PCT/GB2016/053031, dated Mar. 27, 2017.
International Preliminary Report on Patentability for International Application No. PCT/GB2016/053031, dated Apr. 12, 2018.
Search Report for Great Britain Application No. GB 1517307.3, dated Feb. 23, 2016.
Search Report for Great Britain Application No. GB 1611312.8, dated Dec. 5, 2016.
Office Action for corresponding European Application No. 16777762.2, dated Sep. 25, 2020.
Office Action for U.S. Appl. No. 15/763,688, dated Apr. 29, 2021.
Notice of Allowance for U.S. Appl. No. 15/763,688, dated Oct. 12. 2021.

* cited by examiner

POWER MANAGEMENT OF A BATTERY OF A STAIR LIFT SYSTEM

CROSS REFERENCE TO RELATED APPLICATIONS

This application is a continuation of U.S. patent application Ser. No. 15/763,688, filed Mar. 27, 2018, now U.S. Pat. No. 11,254,541, which is a national stage application under 35 U.S.C. 371 of PCT Application No. PCT/GB2016/053031, having an international filing date of 29 Sep. 2016, which designated the United States, which PCT application claimed the benefit of Great Britain Application Nos. 1517307.3, filed 30 Sep. 2015 and 1611312.8, filed 29 Jun. 2016, each of which are incorporated herein by reference in their entirety.

FIELD OF THE INVENTION

The present invention relates to lift systems of the type which comprise a rail (or track) and a seat or platform for supporting a person to be conveyed along the rail. In particular, although not exclusively, the present invention relates to lift systems commonly referred to in the art as stair lift systems, where the rail is typically installed to convey a person from one position, for example at the base of one or more flights of stairs, to a second position at a different height, for example at the top of one or more flights of stairs.

BACKGROUND TO THE INVENTION

A variety of lift systems of the type typically referred to as stair lifts or stair lift systems are known. These include systems in which a single, straight rail is fixed with respect to a single flight of stairs and a seat is coupled to the rail such that the seat base remains horizontal as the seat travels up and down the rail. In such systems, the angle of inclination of the rail with respect to vertical is constant, and the seat has a fixed orientation with respect to the rail.

In other known stair lift systems the rail may be required to follow a more complicated path, for example a path involving inclined sections, flat sections, transitional sections in which an inclination changes from one value to another, curved sections in which the track curves in either a horizontal or vertical plane, and compound curved sections (such as helical sections) in which the track simultaneously curves about horizontal and vertical axis (i.e. the projections of the track path onto a horizontal plane and a vertical plane are both curved). These compound curved sections of track can also be described as sections of track in which the direction of the track in the horizontal plane and the height of the track in the vertical direction are both changing at the same time.

It is known for the carriage assembly to comprise drive means and energy storage means (typically in the form of one or more batteries or battery packs, each of which may comprise one or more cells) for powering the drive means under the control of a controller. It is also known for a lift system to comprise charging means arranged to charge the energy storage means at at least one charging position (or point), for example a plurality of charging positions including a lower charging position at, or near, the bottom of the rail, and at an upper charging position at, or near, the top of the rail.

A problem with such systems, however, is that if the energy storage means becomes flat (or becomes discharged or becomes depleted) while the carriage assembly is away from (i.e. not at) a charging point (for example while the carriage assembly is travelling between charging points or positions), a user may be stranded, for example at an intermediate position along the rail.

It is known for stair lift systems to use lead-acid (e.g. sealed lead acid, SLA) batteries as energy storage means.

Lithium-ion batteries (or battery packs) may also be used in stair lift systems as energy storage means. Lithium-ion battery packs offer certain advantages over certain other types of rechargeable batteries (e.g. Ni-Cads), in particular reduced weight and increased energy storage capacity, and the present inventors have determined that it would be desirable to incorporate Lithium-ion (Li-ion) battery packs in certain lift systems, especially stairlifts, and other person-conveying systems. However, Lithium-ion batteries can be damaged if the battery is discharged below a safe limit. To prevent damage, battery packs often include a protection circuit module (PCM) within the battery enclosure. The PCM shuts the battery pack down if the battery has reached a discharge limit. Once shut down, the battery pack provides zero output and cannot be used again until it has been recharged. The PCM does not provide a warning before it shuts down. If used in a stairlift, a sudden shut down of the battery pack would immediately stop the chair (carriage assembly) leaving the occupant unable to move the lift without outside assistance.

SUMMARY OF THE INVENTION

It is an aim of embodiments of the invention to provide a lift system which solves, at least partly, one or more of the problems associated with the prior art.

Certain embodiments address the problem of users being stranded as a result of battery failure or degradation, or shut down by a PCM, by monitoring at least one energy storage means voltage characteristic and/or at least one lift system (e.g. stair lift) operational characteristic, and generating an alert signal in response to one or more of said characteristics, or a difference between one or more said characteristics, fulfilling a defined criterion, criteria, condition, or conditions.

According to a first aspect of the invention there is provided a lift system comprising
  a rail;
  a carriage assembly comprising a seat or platform for supporting a person to be conveyed along the rail, drive means (module, unit, assembly) arranged to engage the rail and controllable to drive the carriage assembly along the rail, energy storage means (or module or unit) arranged to power the drive means, input means (apparatus) operable by a user to provide an input signal indicative of a desired movement of the carriage assembly along the rail, and control means (e.g. at least one controller, control unit, or control module) arranged to receive said input signal and control said drive means in response to said input signal; and
  charging means (or charging apparatus, charger, charging system) arranged to charge said energy storage means when the carriage assembly is at a first charging position on the rail,
  wherein the control means is arranged to monitor at least one voltage characteristic of the energy storage means and/or at least one operational characteristic of the lift system, and generate an alert signal in response to one or more of said characteristics, or a difference between one or more said characteristics, fulfilling a defined criterion, criteria, condition, or conditions.

Thus, advantageously, an alert signal can be generated, for example indicative of a degradation in performance/capacity of the energy storage means (or a component of it, such as one battery, battery pack, cell, or group of cells), before a user is stranded. The alert signal may be used to prompt the user to seek assistance to have the energy storage means serviced, for example by replacing one or more batteries/packs, used to alert a remote entity (e.g. service/support centre) directly, or stored for "reading" by an engineer when the lift system is next visited.

In certain embodiments the carriage assembly further comprises a memory, and the control means is arranged to store said alert signal, or data indicative of said alert signal having been generated, in said memory.

In certain embodiments the carriage assembly further comprises indicating means (e.g. at least one indicator) arranged to provide said alert signal, or an indication of said alert signal having been generated, to a user of the lift system.

In certain embodiments the carriage assembly further comprises transmitting means (e.g. a transmitter or transceiver) arranged to transmit said alert signal, or an indication of said alert signal having been generated, for reception at a location remote from the lift system.

In certain embodiments the carriage assembly further comprises an interface for providing said alert signal, or an indication of said alert signal having been generated, to external apparatus when connected to said interface.

In certain embodiments the energy storage means comprises a battery having a first terminal and a second terminal, and said at least one voltage characteristic comprises a voltage between (across) said first and second terminals.

In certain embodiments said fulfilling of a defined criterion, criteria, condition, or conditions comprises said voltage falling below a threshold value.

In certain embodiments the controller is adapted to prevent movement of the carriage assembly along the rail in a direction away from the first charging position but allow movement of the carriage assembly along the rail in a direction towards the first charging position when said voltage falls below a threshold value.

In certain embodiments said at least one operational characteristic of the lift system comprises a failure of the carriage assembly to complete a journey from the first charging position to a second position along the rail as a result of said voltage falling below said threshold and the controller preventing further movement towards said second position.

In certain embodiments said failure comprises a failure after starting said journey with the battery fully charged.

In certain embodiments said fulfilling a defined criterion, criteria, condition, or conditions comprises a number of said failures exceeding a threshold number.

In certain embodiments said battery is a lead-acid battery.

In certain embodiments the energy storage means comprises a first battery pack comprising a first pair of output terminals, a first plurality of cells, arranged in electrical parallel with each other and coupled to the first pair of output terminals, and a first protection circuit module arranged to monitor a first voltage across the parallel arrangement of the first plurality of cells and prevent further discharge of the first plurality of cells when or if said first voltage falls below a first threshold value, and wherein said at least one voltage characteristic comprises said first voltage.

In certain embodiments said fulfilling a defined criterion, criteria, condition, or conditions comprises said first voltage falling below a second threshold value, said second threshold value being higher than said first threshold value.

In certain embodiments the controller is adapted to prevent movement of the carriage assembly along the rail in a direction away from the first charging position but allow movement of the carriage assembly along the rail in a direction towards the first charging position when said first voltage falls below a second threshold value, said second threshold value being higher than said first threshold value.

In certain embodiments said at least one operational characteristic of the lift system comprises a failure of the carriage assembly to complete a journey from the first charging position to a second position along the rail as a result of said first voltage falling below said second threshold value and the controller preventing further movement towards said second position.

In certain embodiments said failure comprises a failure after starting said journey with the first battery pack fully charged.

In certain embodiments said fulfilling a defined criterion, criteria, condition, or conditions comprises a number of said failures exceeding a threshold number.

In certain embodiments the energy storage means comprises a first battery (or first battery pack), having respective first and second battery terminals, and a second battery (or second battery pack), having respective first and second battery terminals, the first and second batteries (or battery packs) being connected in series with one another to supply a drive current to the drive means, wherein said at least one voltage characteristic comprises a first voltage between (across) the first and second terminals of the first battery (or first battery pack) and a second voltage between (across) the first and second terminals of the second battery (or second battery pack).

In certain embodiments the first and second batteries (or first and second battery packs) are the same as each other (e.g. they are of the same type as each other; they have the same technical specification; they have the same nominal voltage and capacity; they have the same construction or configuration; and/or they are nominally identical to one another). The alert signal may then be generated in response to some difference being detected in one or more characteristic of the two batteries or packs.

In certain embodiments said fulfilling of a defined criterion, criteria, condition, or conditions comprises one of the first and second voltages falling below a threshold value.

In certain embodiments said fulfilling of a defined criterion, criteria, condition, or conditions comprises a difference between the first and second voltages exceeding a threshold value.

In certain embodiments said difference between the first and second voltages is a difference under zero load (i.e. no output current from series-connected batteries).

In certain embodiments said difference between the first and second voltages is a difference under load (i.e. with output current flowing from series-connected batteries).

In certain embodiments said difference between the first and second voltages is a difference between respective voltages to which the batteries have recovered after being under load.

In certain embodiments said difference between the first and second voltages is a difference after charging the first and second batteries in series and before loading (i.e. before drawing an output current to drive the drive means).

In certain embodiments said at least one voltage characteristic of the energy storage means and/or at least one operational characteristic of the lift system comprises a respective recovery time for the voltage across each pair of battery terminals to recover from a value under load to a steady (static) value under zero load.

In certain embodiments said fulfilling of a defined criterion, criteria, condition, or conditions comprises the respective recovery times differing by more than a threshold length.

In certain embodiments said at least one voltage characteristic of the energy storage means and/or at least one operational characteristic of the lift system comprises a respective charge time for each battery.

In certain embodiments said fulfilling of a defined criterion, criteria, condition, or conditions comprises the respective charge times differing by more than a threshold length.

In certain embodiments the energy storage means comprises a battery or battery pack, the at least one voltage characteristic of the energy storage means comprises a time taken for the battery or battery pack to charge between predetermined voltages.

In certain embodiments said fulfilling of a defined criterion, criteria, condition, or conditions comprises said time taken exceeding a threshold length.

In certain embodiments said fulfilling of a defined criterion, criteria, condition, or conditions comprises said time taken exceeding a threshold length for more than a threshold number of charging cycles.

In certain embodiments the energy storage means comprises a battery or battery pack, the at least one voltage characteristic of the energy storage means comprises a voltage across the battery or battery pack, and said fulfilling of a defined criterion, criteria, condition, or conditions comprises said voltage failing to reach a threshold value after a charging period.

In certain embodiments the energy storage means comprises a first battery or battery pack and a second battery or battery pack connected in series with one another, the at least one voltage characteristic of the energy storage means comprises a first voltage across the first battery or battery pack and a second voltage across the second battery or battery pack, and said fulfilling of a defined criterion, criteria, condition, or conditions comprises said first and second voltages differing by more than a threshold value after a charging period.

In certain embodiments the control means is further arranged to monitor drive current supplied to the drive means from the energy storage means.

In certain embodiments the controller is further arranged to distinguish between journeys corresponding to different users from measurements of the drive current. In other words, the controller may be able to identify the user for a particular journey based on past measurements of load current for that same user.

In certain embodiments the control means is arranged to generate said alert signal in response to a change in an average journey time for a journey between one position and another position on the rail.

In certain embodiments the charging means (or charging apparatus, charger, charging system) is further arranged to charge said energy storage means when the carriage assembly is at a second charging position on the rail.

In certain embodiments the rail is arranged such that said second charging position is higher than said first charging position.

In certain embodiments the rail is a rail assembly, comprising a plurality of rail sections.

In certain embodiments the rail comprises at least one straight section sloping upwardly in a direction from the first charging position towards the second charging position.

In certain embodiments the rail comprises at least one curved section.

According to another aspect of the present invention there is provided a lift system comprising:
 a rail;
 a carriage assembly comprising a seat or platform for supporting a person to be conveyed along the rail, drive means arranged to engage the rail and controllable to drive the carriage assembly along the rail, at least a first battery pack (or module or unit) arranged to power the drive means, input means operable by a user to provide an input signal indicative of a desired movement of the carriage assembly along the rail, and control means arranged to receive said input signal and control said drive means in response to said input signal; and
 charging means arranged to charge said first battery pack when the carriage assembly is at a first charging position on the rail (and optionally when the carriage assembly is at a second charging position on the rail), wherein the first battery pack comprises a first pair of output terminals, a first plurality of cells, arranged in electrical parallel with each other and coupled to the first pair of output terminals, and a first protection circuit module arranged to monitor a first voltage across the parallel arrangement of the first plurality of cells and prevent further discharge of the first plurality of cells when or if said first voltage falls below a first threshold, and said control means is arranged to monitor a first output voltage, said first output voltage being a voltage across said first pair of output terminals, and prevent movement of the carriage assembly along the rail in a direction away from the first charging position (e.g. towards the second charging position) but allow movement of the carriage assembly along the rail in a direction towards the first charging position when the carriage assembly is located away from the first charging position (e.g. between the first and second charging positions, i.e. not at a charging position) and said first output voltage is above said first threshold but below a second threshold, where said second threshold is higher than said first threshold.

Thus, advantageously, movement of the carriage can be prevented before the battery pack shuts down, thereby avoiding potential battery damage and avoiding leaving a user stranded.

In certain embodiments each of said first plurality of cells is a lithium-ion cell.

In certain embodiments the carriage assembly further comprises a second battery pack arranged to power the drive means and to be charged by the charging means when the carriage assembly is at the first or second charging positions, wherein the second battery pack comprises s second pair of output terminals, a second plurality of cells, arranged in electrical parallel with each other and coupled to the second pair of output terminals, and a second protection circuit module arranged to monitor a second voltage (a second cell voltage) across the parallel arrangement of the second plurality of cells and prevent further discharge of the second plurality of cells when/if said second voltage falls below the first threshold, and said control means is arranged to monitor said second output voltage, said second output voltage being a voltage across (between) the second pair of output terminals, and prevent movement of the carriage assembly along the rail in a direction towards the second charging position but allow movement of the carriage assembly along the rail in a direction towards the first charging position when the carriage assembly is located between the first and second charging positions and said second output voltage is above said first threshold but below said second threshold.

In certain embodiments each of said second plurality of cells is a lithium-ion cell.

In certain embodiments the control means is arranged to provide an alert to a user of the carriage assembly in response to the first output voltage or the second output voltage falling below the second threshold.

In certain embodiments the control means is arranged to control the drive means to automatically convey the carriage assembly to the first charging position in response to the first output voltage or the second output voltage falling below the second threshold.

In certain embodiments the carriage assembly further comprises detection means arranged to provide the control means with an indication of the carriage assembly's position along the rail, and a memory arranged to store control data for use by the control means to control movement of the carriage assembly along the rail.

In certain embodiments the first battery pack comprises a plurality of cell packs, each cell pack comprising a respective plurality of cells arranged in electrical parallel with each other, and the plurality of cell packs being arranged in electrical series with one another between the first pair of output terminals, wherein said first plurality of cells are the respective plurality of cells of a first one of said cell packs, said first voltage is a cell pack voltage across said first one of said cell packs, and the first protection circuit module is arranged to monitor a respective cell pack voltage across each cell pack and prevent further discharge of the respective plurality of cells if the respective cell pack voltage falls below said first (predetermined) threshold.

In certain embodiments the carriage assembly comprises a plurality of battery packs, including said first battery pack, each battery pack arranged to power the drive means and to be charged by the charging means when the carriage assembly is at the first or second charging positions, wherein each battery pack comprises a respective pair of output terminals, a respective plurality of cells, arranged in electrical parallel with each other and coupled to the respective pair of output terminals, and a respective protection circuit module arranged to monitor a respective cell voltage across the parallel arrangement of the respective plurality of cells and prevent further discharge of the respective plurality of cells if said respective cell voltage falls below the first threshold, and said control means is arranged to monitor a respective output voltage across each respective pair of output terminals, and prevent movement of the carriage assembly along the rail in a direction towards the second charging position but allow movement of the carriage assembly along the rail in a direction towards the first charging position when the carriage assembly is located between the first and second charging positions and any one of said output voltages is above said first threshold but below said second threshold.

In certain embodiments each battery pack comprises a respective plurality of cell packs, each cell pack comprising a respective plurality of cells arranged in electrical parallel with each other, and each respective plurality of cell packs being arranged in electrical series with one another between the respective pair of output terminals, and each respective protection circuit module is arranged to monitor a respective cell pack voltage across each respective cell pack and prevent further discharge of the respective plurality of cells if said respective cell pack voltage falls below the first threshold.

In certain embodiments the control means is further arranged to prevent movement of the carriage assembly away from the first charging position when the carriage assembly is at the first charging position and at least one of said output voltages (i.e. any one of the first output voltage, the second output voltage, or the plurality of output voltages) is below the second threshold.

In certain embodiments the control means is further arranged to prevent movement of the carriage assembly away from the first charging position when the carriage assembly is at the first charging position and at least one of the said output voltages (i.e. any one of the first output voltage, the second output voltage, or the plurality of output voltages) is below a third threshold, wherein the third threshold is higher than the second threshold.

Another aspect of the invention provides a lift system comprising:
  a rail;
  a carriage assembly comprising a seat or platform for supporting a person to be conveyed along the rail, drive means (module, unit, assembly) arranged to engage the rail and controllable to drive the carriage assembly along the rail, at least a first battery pack (or module or unit) arranged to power the drive means, input means (apparatus) operable by a user to provide an input signal indicative of a desired movement of the carriage assembly along the rail, and control means (e.g. at least one controller, control unit, or control module) arranged to receive said input signal and control said drive means in response to said input signal; and
  charging means (or charging apparatus, charger, charging system) arranged to charge said first battery pack when the carriage assembly is at a first charging position on the rail (and optionally when the carriage assembly is at a second charging position on the rail),
  wherein the first battery pack comprises a first pair of output terminals, and said control means is arranged to monitor a first output voltage, said first output voltage being a voltage across (between) said first pair of output terminals, and prevent movement of the carriage assembly along the rail in a direction away from the first charging position (e.g. towards the second charging position) but allow movement of the carriage assembly along the rail in a direction towards the first charging position when the carriage assembly is located away from the first charging position (e.g. between the first and second charging positions, i.e. not at a charging position) and said first output voltage is below a threshold (e.g. a predetermined, or pre-set threshold).

In certain embodiments the system comprises a plurality of said battery packs and the control means is arranged to monitor a respective output voltage across each respective pair of output terminals and prevent movement of the carriage assembly along the rail in a direction away from the first charging position (e.g. towards the second charging position) but allow movement of the carriage assembly along the rail in a direction towards the first charging position when the carriage assembly is located away from the first charging position (e.g. between the first and second charging positions, i.e. not at a charging position) and any one of said output voltages is below said threshold.

Another aspect of the invention provides a lift system comprising:
  a rail;
  a carriage assembly comprising a seat or platform for supporting a person to be conveyed along the rail, drive means arranged to engage the rail and controllable to drive the carriage assembly along the rail, at least a first battery pack (or module or unit) arranged to power the drive means, input means operable by a user to provide an input signal indicative of a desired movement of the carriage assembly along the rail, and control means arranged to receive said input signal and control said drive means in response to said input signal; and charging means arranged to charge said first battery pack when the carriage assembly is at a first charging position on the rail, and optionally when the carriage assembly is at a second charging position on the rail, wherein the first battery pack comprises a first pair of output terminals, a first plurality of cells, arranged in electrical parallel with each other and coupled to the first pair of output terminals, a first circuit module (e.g. protection circuit module) arranged to monitor a first voltage across the parallel arrangement of the first plurality of cells and prevent further discharge of the first plurality of cells when or if said first voltage falls below a first threshold, and a second circuit module arranged to monitor said first voltage and generate an output signal indicative of whether said first voltage is above or below a second threshold, said second threshold being higher than said first threshold, and said control means is arranged to receive said output signal, and, if said output signal indicates that said first voltage is below the second threshold, prevent movement of the carriage assembly along the rail in a direction away from the first charging position, for example towards the second charging position, but allow movement of the carriage assembly along the rail in a direction towards the first charging position when the carriage assembly is located away from the first charging position, for example between the first and second charging positions. Another aspect provides a corresponding method of operating or controlling a lift system.

In certain embodiments the controller is further arranged, in response to said output signal indicating that said first voltage is below the second threshold while the carriage assembly is travelling along the rail at a first speed, to control the drive means to reduce the speed of travel to a second speed.

In certain embodiments the controller is further arranged to monitor said output signal after reducing said speed of travel, and, if said output signal indicates that the first voltage has risen above the second threshold as a result of said reducing, allowing movement of the carriage assembly away from the first charging position, and, if said output signal indicates that the first voltage is still below the second threshold after said reducing, preventing movement of the carriage assembly away from the first charging position but allowing movement towards the first charging position.

In certain embodiments the lift system is a stairlift system installed, or for installation, to convey a person up and down stairs.

In certain embodiments the carriage assembly further comprises detection means arranged to provide the control means with an indication of the carriage assembly's position along the rail.

In certain embodiments the carriage assembly further comprises a memory arranged to store control data for use by the control means to control movement of the carriage assembly along the rail.

In certain embodiments the carriage assembly further comprises an inclination detector arranged to provide the controller with an indication of an inclination of the rail at the current position of the carriage assembly.

Another aspect of the invention provides a carriage assembly for (adapted for use in) a lift system in accordance with any one of the above-mentioned aspects.

Another aspect of the invention provides a battery pack comprising a first circuit module for shutting down the pack in response to detecting a cell voltage below a first threshold, and a second circuit module arranged to provide an output signal indicative of whether a cell voltage is above or below a second threshold, higher than the first.

Another aspect of the present invention provides a method of operating a lift system comprising a rail, a carriage assembly comprising a seat or platform for supporting a person to be conveyed along the rail, drive means (module, unit, assembly) arranged to engage the rail and controllable to drive the carriage assembly along the rail, energy storage means (or module or unit) arranged to power the drive means, input means (apparatus) operable by a user to provide an input signal indicative of a desired movement of the carriage assembly along the rail, and control means (e.g. at least one controller, control unit, or control module) arranged to receive said input signal and control said drive means in response to said input signal, and charging means (or charging apparatus, charger, charging system) arranged to charge said energy storage means when the carriage assembly is at a first charging position on the rail, the method comprising:

monitoring at least one voltage characteristic of the energy storage means and/or at least one operational characteristic of the lift system, and generating an alert signal in response to one or more of said characteristics, or a difference between one or more said characteristics, fulfilling a defined criterion, criteria, condition, or conditions.

Another aspect of the invention provides a method of operating a lift system comprising a rail, a carriage assembly comprising a seat or platform for supporting a person to be conveyed along the rail, drive means (module, unit, assembly) arranged to engage the rail and controllable to drive the carriage assembly along the rail, at least a first battery pack (or module or unit) arranged to power the drive means, input means (apparatus) operable by a user to provide an input signal indicative of a desired movement of the carriage assembly along the rail, and control means (e.g. at least one controller, control unit, or control module) arranged to receive said input signal and control said drive means in response to said input signal, and charging means (or charging apparatus, charger, charging system) arranged to charge said first battery pack when the carriage assembly is at at least one charging position on the rail, the method comprising:

monitoring an output voltage of the battery pack and automatically inhibiting movement of the carriage assembly (e.g. away from a charging position, such as a nearest charging position, or a charging position reachable by expending a smallest amount of energy) if said output voltage is (or falls) below a threshold.

In certain embodiments of the aspect described immediately above, said threshold is a second threshold, the battery pack comprises a first pair of output terminals, a first plurality of cells, arranged in electrical parallel with each other and coupled to the first pair of output terminals, and a first protection circuit module arranged to monitor a first voltage across the parallel arrangement of the first plurality of cells and prevent further discharge of the first plurality of cells when or if said first voltage falls below a first threshold, said output voltage of the battery pack is a voltage across said first pair of output terminals, and said second threshold is higher than said first threshold.

Features of any one aspect or embodiment may be incorporated in any other aspect or embodiment with corresponding advantage.

BRIEF DESCRIPTION OF THE DRAWINGS

Embodiments of the invention will now be described with reference to the accompanying drawings of which.

DETAILED DESCRIPTION OF EMBODIMENTS OF THE INVENTION

Figure 1:
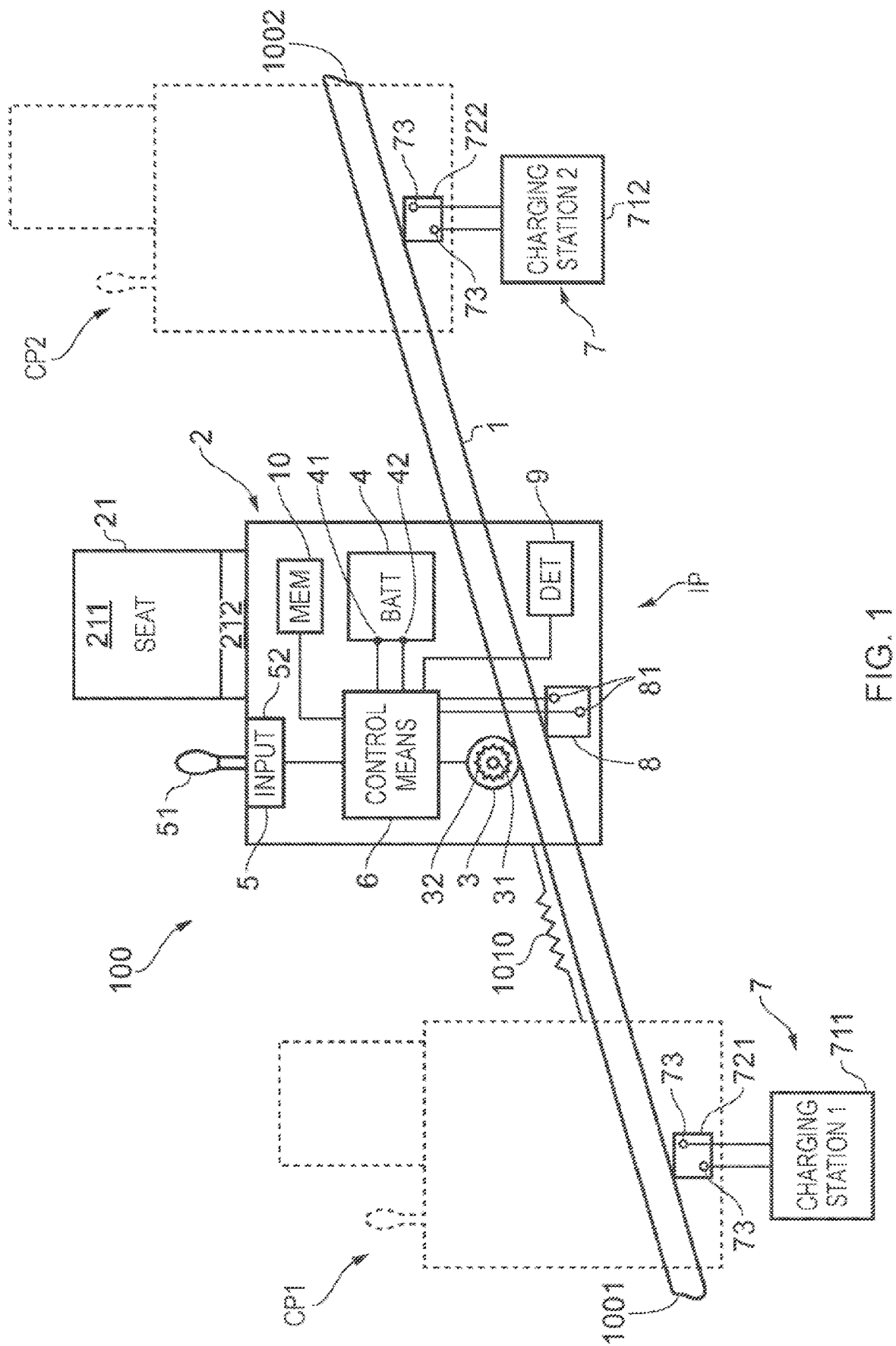
FIG. 1 is a highly schematic representation of a lift system, in the form of a stairlift, embodying the invention.
Figure 2:
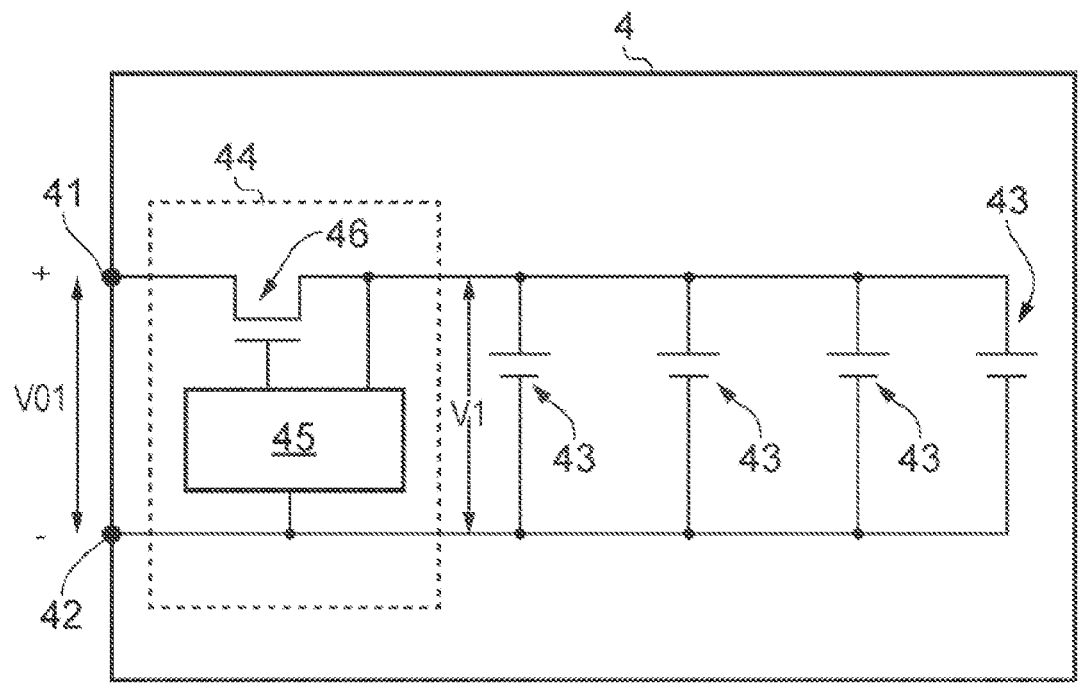
FIG. 2 is a schematic representation of a battery pack or module for use in embodiments of the invention.

Referring now to FIG. 1, this shows a lift system 100, in the form of a stairlift, embodying the invention and comprising: at least one rail 1; a carriage assembly 2 comprising a seat or platform 21 for supporting a person to be conveyed along the rail, drive means 3 arranged to engage the rail and controllable to drive the carriage assembly along the rail, at least a first battery pack (module) 4 (as shown in FIG. 2) arranged to power the drive means, input means 5 operable by a user to provide an input signal indicative of a desired movement of the carriage assembly along the rail, and control means (e.g. a controller) 6 arranged to receive said input signal and control said drive means in response to said input signal; and charging means 7 arranged to charge said first battery pack when the carriage assembly is at a first charging position CP1 on the rail and when the carriage assembly is at a second charging position CP2 on the rail, wherein the first battery pack comprises a first pair of output terminals 41, 42, a first plurality of cells 43, arranged in electrical parallel with each other and coupled to the first pair of output terminals, and a first protection circuit module 44 arranged to monitor a first voltage (which may be described as a first cell voltage) across the parallel arrangement of the first plurality of cells and prevent further discharge of the first plurality of cells when/if said first voltage falls below a first (predetermined) threshold, and said control means is arranged to monitor a first output voltage VO1 (that being the output voltage across or between the first pair of output terminals 41, 42) and prevent movement of the carriage assembly along the rail in a direction towards the second charging position but allow movement of the carriage assembly along the rail in a direction towards the first charging position when the carriage assembly is located between the first and second charging positions and the first output voltage is above said first threshold but below a second threshold, where said second threshold is higher than said first threshold.

In this embodiment, the rail 1 in the form of a single unit which is substantially straight and is installed such that it extends upwards from a first end 1001 to a second end 1002 with a constant gradient. However, it will be appreciated that in other embodiments the rail may have different forms, may include straight sections, curved sections, horizontal sections, sections with changing gradients, sections with constant gradients, or indeed any combinations of such sections. In certain embodiments the "rail" may in fact comprise a plurality of rails, such as a pair of rails, along which the carriage assembly may be arranged to travel. Thus, in alternative embodiments the rail may be modular, and may be a rail assembly comprising a plurality of sections, portions, or rails assembled together.

Returning to the current embodiment, the seat or platform 21 comprises a seat having a back portion 211 and a base portion 212 for supporting a user seated on the seat 21. The drive means, or module, 3 comprises an electric motor, powered from the battery module 4 under the control of the control means 6, which has a rotor shaft 31 connected to a toothed gear 32 which is arranged to engage a toothed portion 1010 of the rail 1 (only a part of which is shown on the figure for clarity) such that rotation of the motor drives the carriage assembly 2 along the rail 1. Alternative embodiments may, of course, employ different forms of drive means, and the invention, in its broadest sense, is not limited to using any particular form of drive means.

In its first embodiment, the input means 5 comprises a base 52 and joy stick 51 operable by the user, seated on the seat 21, to provide an input signal indicative of a desired direction of movement along the rail. In alternative embodiments, different forms of input means may be employed, such as remote control units or handsets, keypads, input units with a plurality of control keys or buttons etc., and it will be appreciated that the invention in its broadest sense is not limited to using any particular form of input means.

The carriage assembly further comprises a connector or connection means 8 arranged to engage and provide electrical connection to the corresponding connectors or connection means 721, 722 of the charging means 7 when the carriage assembly is located either at the first, or lower, charge point CP1, or the second, or upper, charge point CP2. The connector 8 of the carriage assembly in this example comprises a pair of connection terminals 81 which engage with the corresponding connection terminals 73 of the lower charging means connector 721 or the upper charging connector 722 when the carriage assembly is at the first or second charging positions CP1, CP2 respectively. The charging means 7 in this embodiment comprises a first, or lower charging station 711, coupled to the lower charging point connector 721 and arranged to supply current to charge the battery module 4, via the coupled terminals 73 and 81 when the carriage assembly is in the first charging position CP1. The charging means also comprises a second charging station 712 (which may also be described as a second charging module or upper charging module) arranged to supply current to charge the battery module 4 when the carriage assembly is in the upper charge position CP2 and the terminals 73 of the upper charging connector 722 are coupled with (i.e. in contact with) the terminals 81 of the carriage assembly connector 8.

The carriage assembly in this embodiment further comprises a memory or memory means 10 adapted to store data used by the control means in the control of the movement of the carriage assembly along the rail. This data may include data indicative, for example, of the slope of the rail, the length of the rail, a map of the rail (particularly in embodiments where the slope and/or shape of the rail is not constant along its length), and data indicative of the programmed or appropriate speed of travel of the carriage assembly along the rail at different positions along its length. The carriage assembly also comprises a detector or detection means 9 operable to provide the control means with an indication of the instantaneous position of the carriage assembly along the rail, and/or the instantaneous slope and/or curvature of the rail, and/or the instantaneous speed of travel along the rail. The control means is adapted to use the signal from the detection means 9 in conjunction with data from the memory 10 to control the speed of travel of the carriage assembly along the rail in response to user input, for example by automatically slowing the carriage assembly down as it approaches one of the charging positions CP1, CP2.

In FIG. 1 the carriage assembly 2 is shown at an intermediate position, IP, between the upper and lower charging positions CP1 and CP2.

Referring now to FIG. 2, this shows the battery unit 4 of the carriage assembly for the system of FIG. 1 in more detail. The battery module 4 comprises a plurality of cells 43 connected in electrical parallel with one another, between the positive and negative output terminals 41, 42 of the battery module 4. The battery module further comprises a first protection circuit module 44 arranged to monitor a first voltage V1 across the parallel arrangement of the plurality of cells 43 and prevent further discharge of the plurality of cells 43 if that first voltage V1 falls below a first, predetermined threshold. To achieve this, the first protection circuit module 41 comprises a controllable switching device 46, in the form of an FET in this example, and a control circuit 45 arranged to monitor the voltage V1 across the cells 43 and open the controllable switching device 46 by means of supplying an appropriate control voltage to its gate terminal if that voltage V1 falls below the predetermined first threshold. Effectively, the protection circuit module 44 disconnects the parallel arrangement of battery cells 43 from the output terminals 41, 42 when the voltage across those cells falls below the predetermined threshold. Thus, further discharge of the cells is prevented, and hence damage to the cells is prevented. In this particular embodiment, the cells are lithium-ion cells (Li-ion cells). However, alternative embodiments may employ different cells and batteries, including, but not limited to, NiCd, NiMH, Lithium Poly, and lead-acid.

It will be appreciated that when the controllable switching device 46 is in the conducting state, and the parallel arrangement of cells 43 is connected to the output terminals 41, 42 of the battery module, the control means 6 connected to the battery module 4 is thus able to monitor the voltage V1 across the cells, as, in this example, which comprises just one "pack" of parallel-connected cells, the output voltage VO1 across the output terminals 41, 42 is substantially equal to the cell voltage V1. In alternative embodiments, such as that described below with reference to FIG. 10, a number of series-connected cell packs may be employed, in which case the output voltage is not equal to the cell voltage across just one of the packs. Returning to the first embodiment, as mentioned above, the control means is further arranged so that if it detects the output voltage (equal to voltage V1 in this example) dropping below a second predetermined threshold (that second predetermined threshold being higher than the first predetermined threshold at which the protection circuit module 44 "disconnects" the cells and prevents further discharge) the control means in this example is arranged to prevent movement of the carriage assembly upwards along the rail towards the second charging position CP2, even if a user operates the input means 5 to indicate that further upward motion is desired. In this way, before the integral protection circuit module 44 of the battery unit 4 effectively disconnects the battery cells (which would result in the carriage assembly stopping on the rail without warning and not being able to move further) the control means is able to detect that the battery pack output voltage is getting dangerously low and prevent further upward movement before that automatic shut-down situation is reached. When the output voltage VO1 has fallen below the second (upper) threshold, but is still above the first (lower) threshold, the controller is arranged so that it allows only downward movement of the carriage assembly along the rail, towards the lower charging point CP1, this downward movement of course consuming less power than upward movement. In certain embodiments, when the controller detects that the battery module output voltage VO1 has fallen below the second, upper threshold when the carriage assembly is at an intermediate position, labelled IP in FIG. 1, it simply may allow the user only to move in the downward direction (in other words the user may simply receive no response to an input signal indicating a desire to move upwards, but in response to an input signal indicating a desire to move downwards the carriage assembly may move in that direction). Alternatively, in certain other embodiments when the control means detects this condition, it may provide the user with a suitable indication, alerting the user to the fact that upward movement is not permitted, and indicating that the user should instead operate the input means to move the carriage assembly downwards to the lower charging position CP1. In further alternative embodiments, when the control means detects this condition it may automatically control the drive means to convey the carriage assembly down to the lower charging position CP1. When it reaches that position the controller may then cause the carriage assembly to remain at that position CP1 until the battery module 4 is sufficiently charged to enable travel up the rail to the upper charging point CP2. This may involve the control means monitoring the battery output voltage VO1 to detect when it exceeds the second predetermined threshold. Alternatively, the controller may be arranged to allow upward movement of the carriage assembly from the lower charge position CP1 upwards towards the upper charge position CP2 only when the battery output voltage VO1 has exceeded a third predetermined threshold, higher than the second threshold, where that third predetermined threshold has been selected as corresponding to a level of charge sufficient to provide the energy for conveying the carriage assembly all the way to the upper charge point CP2.

Figure 3:
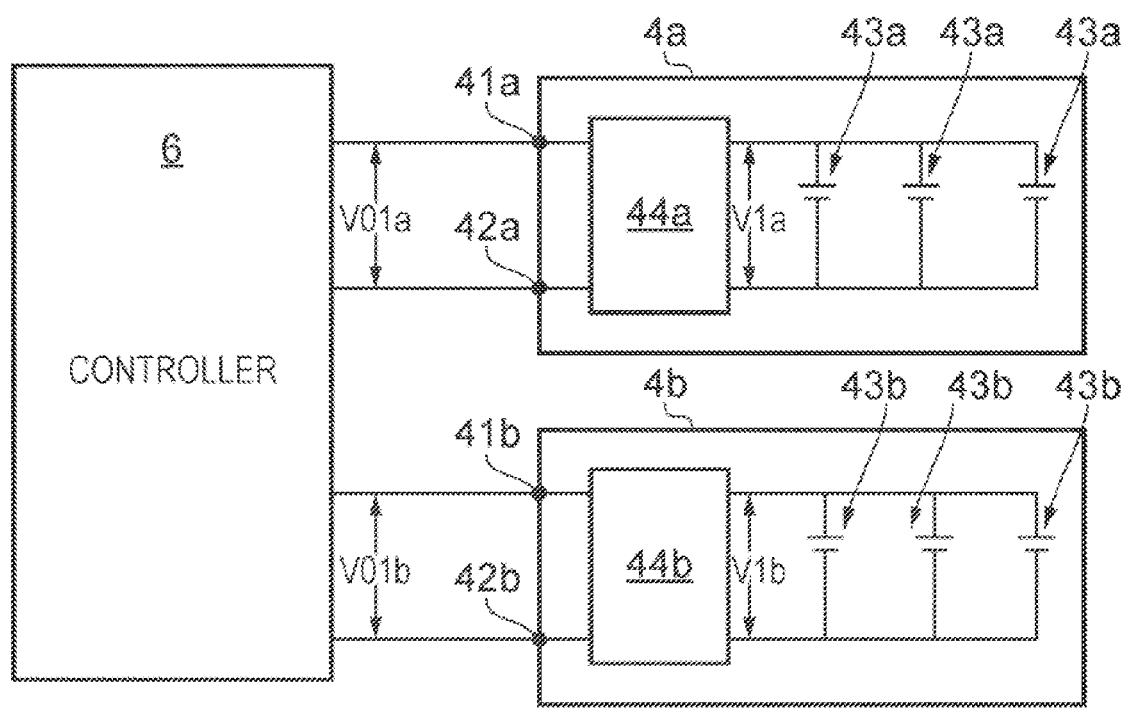
FIG. 3 is a schematic representation of an arrangement of a controller and two battery packs for use in certain embodiments of the invention.

Referring now to FIG. 3, this shows a controller (or control means) 6 and battery module arrangement suitable for use in certain embodiments of the invention. Here, the carriage assembly comprises first and second battery modules 4a, 4b respectively, each comprising a respective pair of output terminals 41a, 42a and 41b, 42b, a respective plurality of cells 43a, 43b, and a respective protection circuit module 44a, 44b, where the components of the protection circuit modules and connections between the components and battery terminals 41, 42 are as shown in the arrangement of FIG. 2. In this arrangement of FIG. 3, the controller 6 is arranged to monitor the output voltage VO1a of the first battery module (which is equal to the voltage V1a across the first plurality of cells 43a) and the output voltage VO1b of the second battery module (which is equal to the voltage V1b across the second plurality of cells 43b). If either of these output voltages VO1a, VO1b drops below the second predetermined threshold then the controller is arranged to prevent further upward movement of the carriage assembly along the rail, and instead allow only movement in the downward direction, toward the lower charge point CP1. In this way, the carriage assembly is able to reach the lower charge point CP1 without either of the battery modules 4a, 4b being shut down by its respective protection circuit module 44a, 44b.

Thus, it will be appreciated that embodiments of the invention may employ a single battery module, or a plurality of battery modules (e.g. 2, 3, or more).

In certain embodiments the battery pack is adapted to provide a warning signal itself. Certain embodiments employ battery packs with modified PCMs 44, where each battery pack produces a warning signal (at a cell pack voltage at least a little higher than the threshold voltage at which the PCM nay shut the pack down) which the controller then uses to control/inhibit movement (e.g. prevent upward movement). In such embodiments, the controller may not need to monitor battery output voltage. Instead, it may inhibit movement in response to receiving the warning signal or alert from any one of the PCMs 44. Thus, each PCM may be arranged to shut down the respective battery pack at a first cell-pack threshold voltage, but before reaching that shut-down condition, emit a warning or alert signal to the controller in response to a cell-pack voltage ailing below a second (higher) threshold voltage. Thus, the controller may, even without monitoring output voltage directly, receive an early indication of low-battery condition, and thus be able to inhibit motion and prevent battery pack shutdown, damage, and stranding of a user at an intermediate position.

Figure 4:
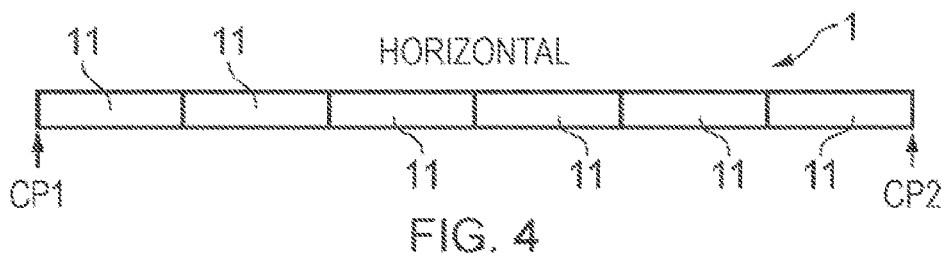
FIG. 4 is a schematic representation of a rail used in certain embodiments of the invention.

Referring now to FIG. 4, this is a highly schematic representation of a modular rail 1 which may be used in embodiments of the invention. The rail 1 comprises a plurality of rail sections 11 which are joined to provide the overall rail assembly along which a carriage may be conveyed. The rail 1 of FIG. 4 can be described as a horizontal rail with 0° inclination. In certain embodiments, each section 11 may be straight. In alternative embodiments, one or more, or indeed all, of the sections 11 may be curved. When used in an embodiment of the invention, the controller, when the carriage assembly is at charge point CP1, or is at a position closer to charge point CP1 than CP2, may prevent movement of the carriage assembly towards charge point CP2 if the battery output voltage is below the appropriate threshold voltage. For example, if the distance between CP1 and CP2 is very large, and the carriage assembly is arranged so that it knows its current position along the rail assembly, a determination can be made, according to the battery output voltage, whether the carriage would be able to reach charge point CP2, or just CP1. Movement of the carriage assembly may then be automatically controlled, according to the determination of the battery output voltage.

Figure 5:
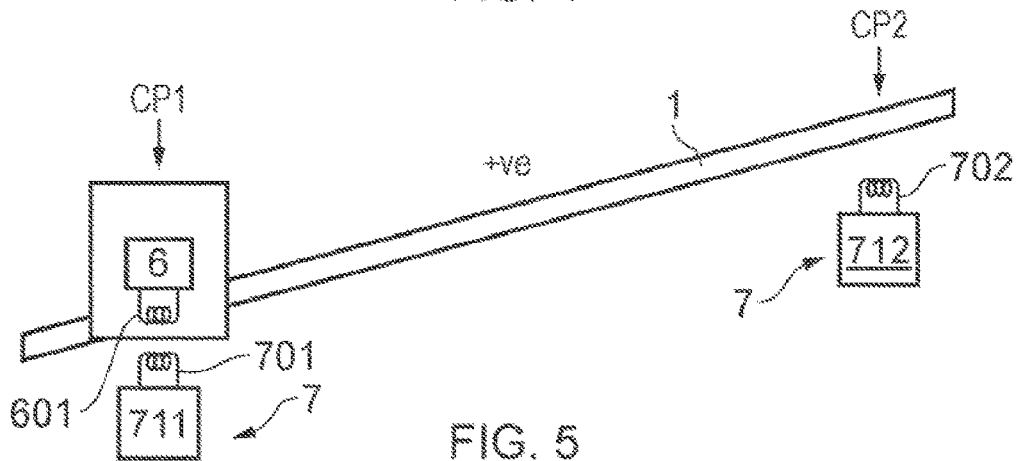
FIG. 5 is a schematic representation of part of another lift system embodying the invention.

Referring to FIG. 5, this is another highly schematic representation of another stair lift system embodiment the invention. Here, rather than there being direct electrical contact between terminals on the carriage assembly and terminals at the charge points, the charging method is inductive (i.e. contactless). Each charging station 711, 712 comprises a respective induction coil 701, 702 by means of which a time-varying magnetic field can be generated. When the carriage assembly is at charge point CP1 a corresponding induction coil 601, coupled to the control means 6, senses the changing magnetic field generated by the charging station 1. A charging voltage and current can thus be induced in the carriage assembly, which the control means is able to direct so as to charge the battery pack or packs. In this example, the rail 1 is inclined at a fixed inclination according to the side view. The rail may or may not have curved sections, according to different embodiments.

Figure 6:
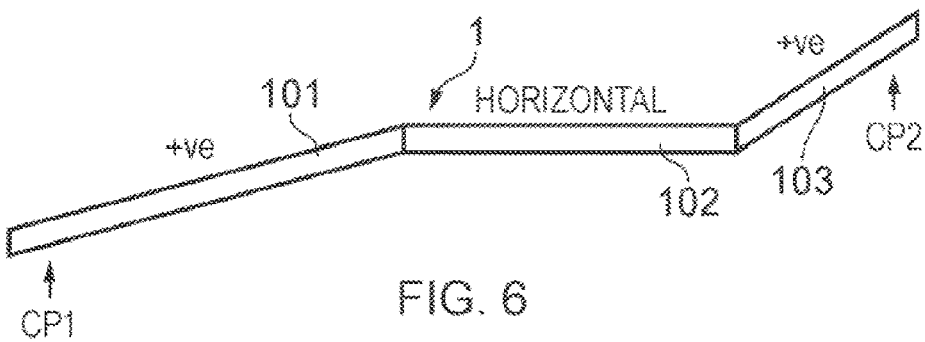
FIG. 6 is a schematic representation of a modular rail assembly for use in certain embodiments of the invention.

Referring now to FIG. 6, this shows a multi-sectional rail 1 which may be used in certain embodiments of the invention. It is a combination of a first inclined rail section 101, a horizontal section 102, followed by another inclined section 103 which may have a different inclination to the first inclined section 101. Again, in certain embodiments, such rail systems may or may not have curved sections.

Figure 7:
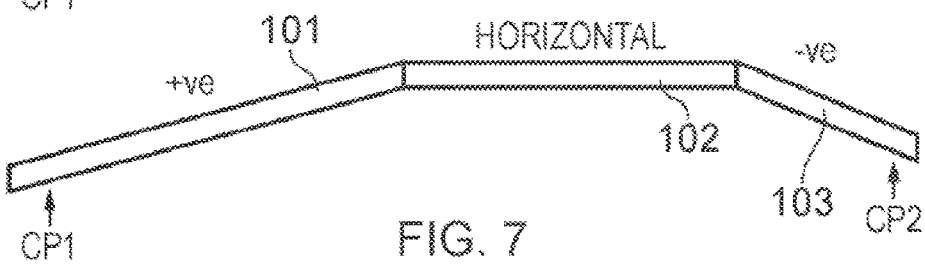
FIG. 7 is a schematic representation of another modular rail assembly for use in embodiments of the invention.

Referring now to FIG. 7, this shows another multi-sectional rail assembly which may be used in embodiments of the invention. The system comprises a first rail section 101 having positive slope, a second horizontal rail section 102, and a third inclined rail section 103 of negative slope. Charge point 1 is at the lower end of the first section, and charge point 2 is at the lower end of the third section 103. In embodiments incorporating such rails, the controller may be arranged so that it inhibits movement away from either charge point CP1 or charge point CP2 if the battery output voltage is below the second predetermined threshold voltage (or other appropriate threshold voltage, in alternative embodiments of the invention) as any such movement would entail travelling first of all in an upwards direction. The carriage assembly may be adapted so that it knows its position along the rail, and/or can detect the slope of the portion of rail on which it is currently situated. Thus, when the carriage assembly is on the horizontal section of the rail it may know this, and if the battery output voltage (or one of the battery output voltages) falls below the relevant threshold, the controller may still permit movement of the carriage assembly, in response to user input, towards either the first charge point CP1 or the second charge point CP2, as either journey will involve just travel along a horizontal portion and then down along an inclined portion of the rail system.

Figure 8:
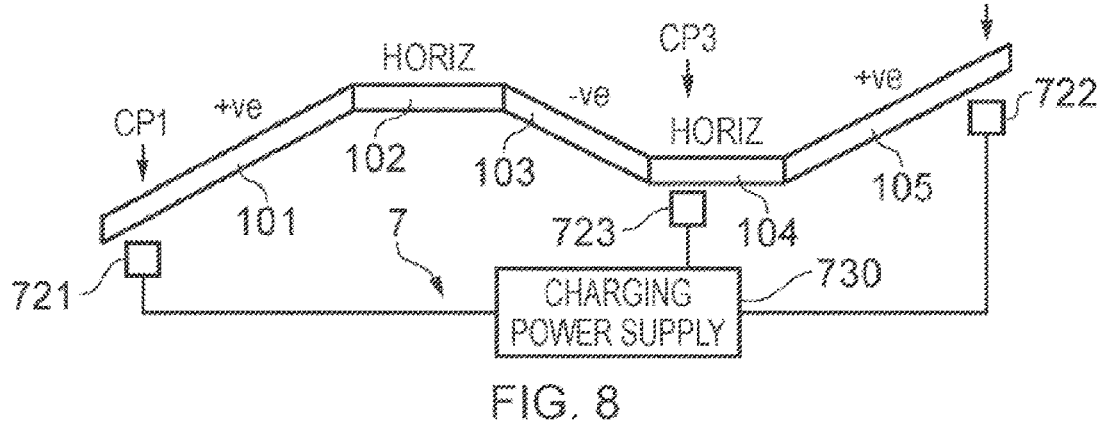
FIG. 8 is a schematic representation of another modular rail assembly and charging means for use in certain embodiments of the invention.

Referring now to FIG. 8, this shows part of another stair lift system embodying the invention comprising a multi-sectional rail assembly and a charging system comprising a charging power supply 730 and three charging stations 721, 722, 723, with corresponding charge points CP1, CP2, and CP3. The rail assembly comprises two horizontal portions 102 and 104, and three inclined sections 101, 103, and 105. Again, in certain embodiments, such rail systems may or may not have curved sections. If a low battery output voltage condition is detected while the carriage assembly is on horizontal section 102, the controller may be arranged still to allow movement towards either CP1 or CP2, as each journey involves no travel in an upwards direction. However, the controller may be arranged such that in response to detecting a low battery output voltage condition when the carriage assembly is on horizontal section 101, or more particularly at charge point 3, it prevents movement of the carriage assembly upwards along either section 103 or section 105. Thus, in certain embodiments, the controller may combine pre-knowledge of the rail profile with measurements of the battery pack output voltage to automatically inhibit motion of the carriage assembly along the rail under certain conditions.

Figure 9:
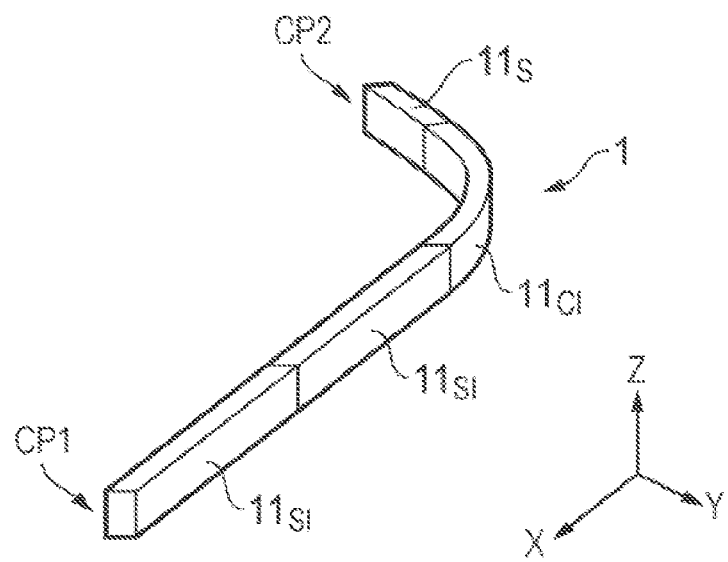
FIG. 9 is a schematic representation of another modular rail assembly which may be used in embodiments of the invention.

Referring now to FIG. 9, this shows another rail system 1 which may be used in embodiments of the invention. The rail 1 extends upwardly from a first charge point CP1, with two straight inclined sections 11SI. The rail then continues upwardly and curves to the left, in curved inclined section 11CI, and then extends to the upper charge point CP2 along straight, non-inclined section 11S.

Figure 10:
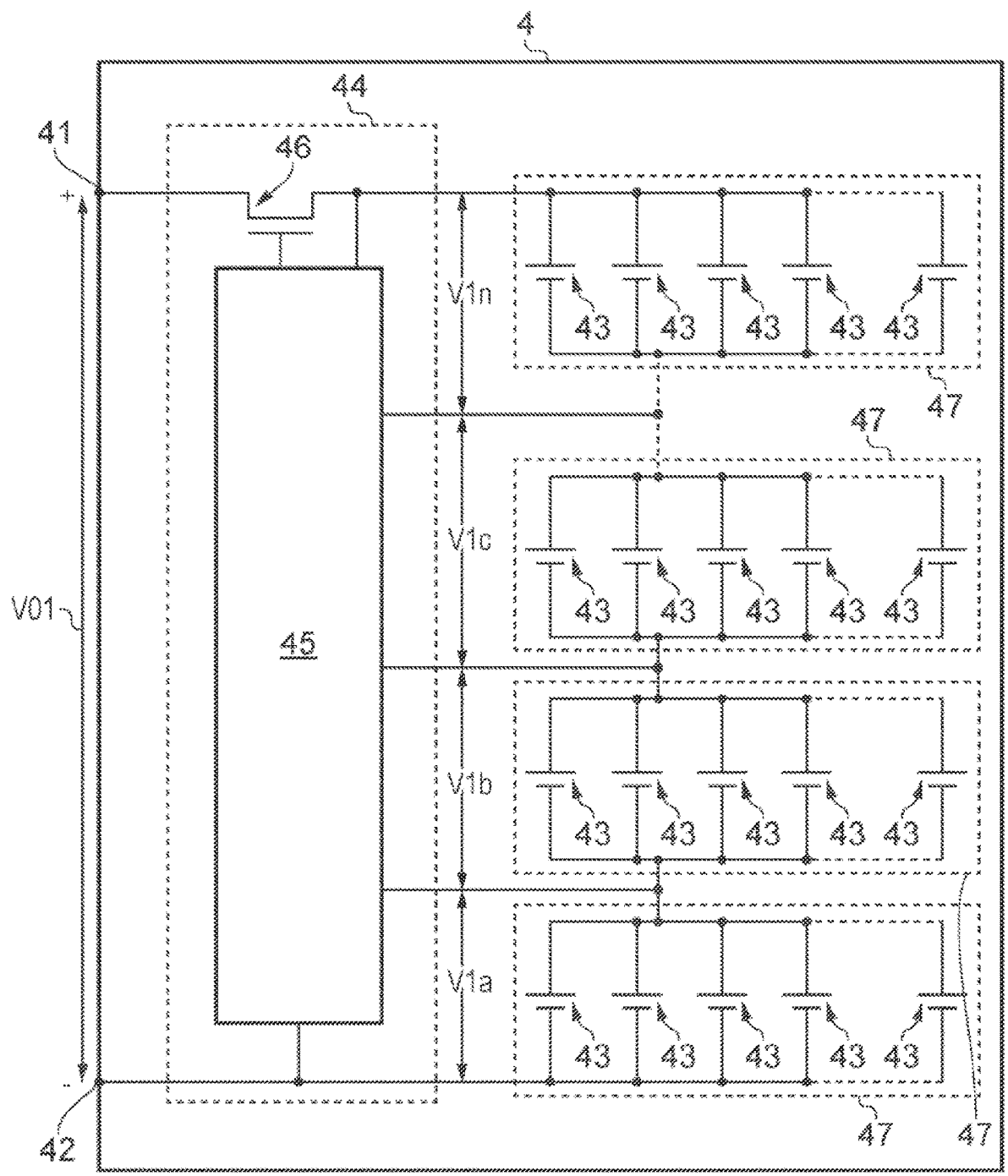
FIG. 10 is a diagram of another battery module (or pack), incorporating a plurality of multi-cell power packs, or blocks, which may be used in embodiments of the invention.

Referring now to FIG. 10, this shows another battery pack (which may also be called a battery module) which may be used in embodiments of the invention. It will also be appreciated that certain embodiments of the invention may incorporate a plurality of battery packs of the type described with reference to FIG. 10. The battery pack 4 is constructed from numerous individual cells 43 connected in a series/parallel format, as shown. One, or a plurality of cells 43 are connected in parallel to form a plurality of power cells 47 (or cell packs) in order to boost the current capacity of the battery pack. Thus, each cell pack comprises a respective plurality of cells connected in electrical parallel, and each cell pack 47 has a respective cell pack voltage V1$a$, V1$b$, etc. One, or a plurality of power cells 47 are connected in series to define the voltage output of the battery pack. Thus, in this example, a plurality of cell packs 47 are connected in electrical series between the battery pack output terminals 41, 42, such that, when the transistor 46 is conducting, the voltage at the battery output terminals VO1 is equal to the sum of the cell pack voltages. The control circuit (45) is arranged to monitor the voltage of the cells 43 in each power pack 47, thus measuring cell pack voltages V1$a$, V1$b$, V1$c$ ... V1$n$. If the voltage of any cell 43 in any power cell (cell pack) 47 falls below the control circuit threshold (I.e. the first threshold) then the switching device 46 will be controlled to disable the battery pack output. The controller 6 of the carriage assembly monitors the external voltage, i.e. the output voltage VO1, and uses that voltage to determine whether or not to inhibit movement of the carriage assembly, before any of the cell packs triggers the battery pack to shut down.

Further detail on how the controller monitors battery output voltage(s) and controls/inhibits movement in embodiments of the invention is as follows.

Figure 11:
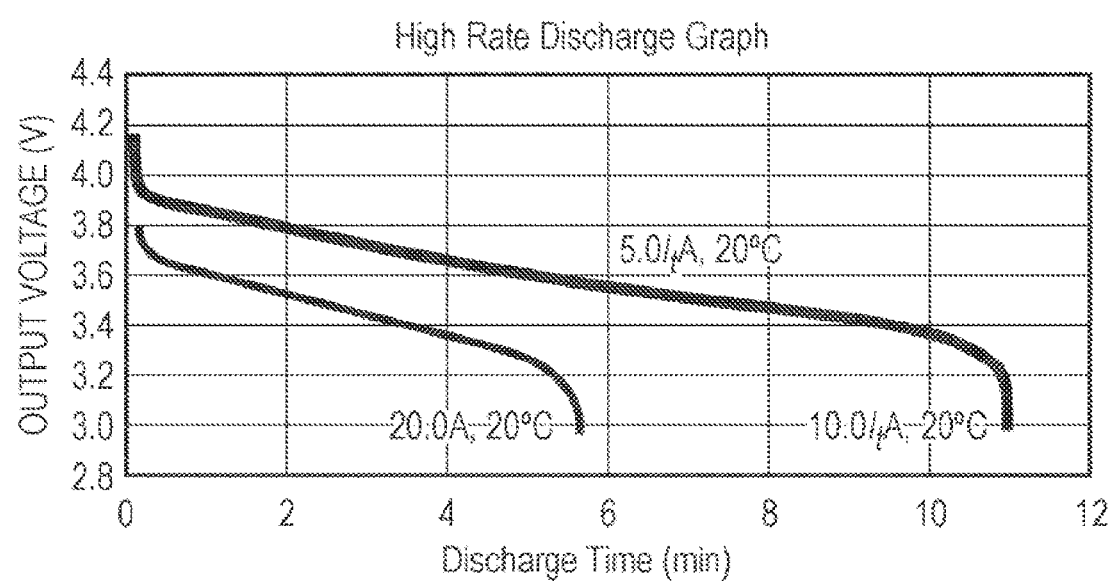
FIG. 11 is a graph of the discharge performance of a block of cells in a battery module suitable for use in embodiments.

As previously described with reference to FIG. 10, the battery packs in certain embodiments consist of 3 or 4 cells wired in parallel as a block with four of the blocks wired in series to form the complete battery pack. For certain battery packs the PCM circuit 44 has a shutdown specification of 2.8V for the voltage of a block (i.e. cell pack voltage). This would suggest that the shutdown output voltage for the battery pack as a whole would be 4*2.8=11.2V. However during testing it was found that battery packs could shut down at battery output voltages of 12.65V or higher when subjected to a 2 A load. Not all the cells in the battery pack will be identical so a rogue cell could cause an early PCM shut down. A graph of the discharge performance of a typical block is given in FIG. 11.

The voltage drop against time is reasonably constant for various loads but drops rapidly as the voltage falls below 3.2V. This would suggest a second threshold voltage of 4*3.2=12.8V which is only just above the PCM shut down voltage seen in the bench tests with real batteries.

The choice of second threshold voltage has to be balanced between too high a value, where the low battery fault is triggered too early, reducing the number of journeys achievable with a fully charged pack, or too low where there is risk of PCM shutdown. The final value was determined by experiments on representative lifts and the number of successful journeys. The chosen second threshold voltage is 13.5V in certain embodiments.

The third threshold voltage which may be used by the controller to determine whether to prevent the lift moving away from the bottom charge point until the battery has been substantially recharged is set at 1.4V above the second threshold in certain embodiments, i.e. at 14.9V.

With regard to monitoring the battery output voltages, in certain embodiments the battery pack voltages are sampled at a rate of 1300 samples per second, and eight samples are averaged so the effective new data rate is approximately 162 readings per second. The conversions are performed continuously; it does not matter what the lift is doing. The sample rate is high, and may be set at such a value to suit the analogue to digital subsystem which may need to monitor other signals this frequently.

In certain embodiments the measured voltage is compared to the threshold voltages with an accuracy of 0.1V. The resolution of the measurement therefore needs to be in the order of 0.02V over a measured range of 0 to 33V (see below). A resolution of 1 in 1650. This can be challenging for an average microprocessor, so in certain embodiments the analogue to digital conversion for the battery voltage is calibrated using known voltages and a least squares technique to achieve the required accuracy and resolution.

Figure 12:
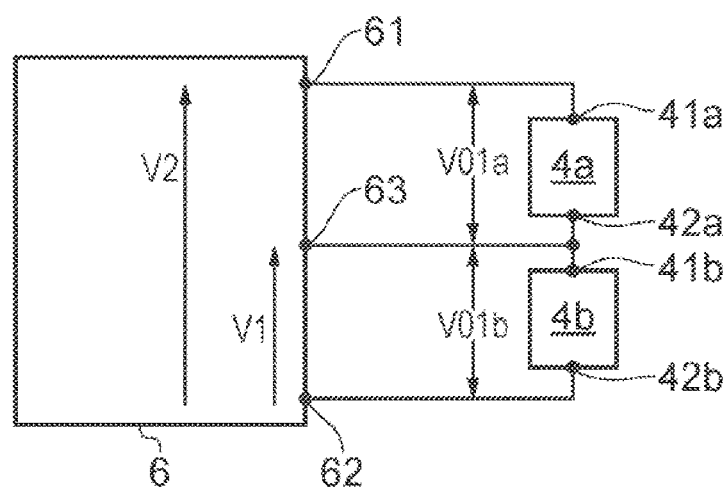
FIG. 12 is a diagram of the controller and two series-connected battery modules used in certain embodiments of the invention.

Referring now to FIG. 12, this shows part of a lift system embodying the invention, comprising a controller 6 and two battery packs 4A, 4B connected in electrical series between controller input terminals 61 and 62. In this embodiment the two battery packs have the same specification. With regard to the question of monitoring two battery packs, which, in general, will not discharge at precisely the same rate as each other, in certain embodiments two battery packs are wired in series (as shown in FIG. 12) to achieve the required 32V for the motors. Without controller intervention, one or other of the packs will shut down first. Measuring the 32V with one 'voltmeter' would be insufficient to determine whether a pack was about to shut down due to differences in the pack performance. The second threshold value would have to be set even higher to accommodate the variation between packs. Therefore, in such embodiments, the voltage of each pack is measured. The controller 6 (or controller board) in certain embodiments measures two voltages as follows (with reference to FIG. 12):

V1 is the output voltage (VO1$b$) of pack 4$b$, V2 is the output voltage of pack 4$b$ plus pack 4$a$ so the pack 4$a$ output voltage VO1$a$ is V2 minus V1. Hence V2 needs to measure more than 33V with a 0.02V resolution in certain embodiments. Controller 6 thus receives battery current via its terminals 61 and 62, with terminal 63 being used to enable monitoring of the individual battery pack output voltages.

An alternative differential analogue to digital converter could be used where the A/D has two wires per measurement channel and converts the voltage between the two wires rather that the voltage between a single wire and ground (0V). In this case the voltage across pack 4a could be measured directly.

In certain embodiments the magnitude of the second threshold voltage is set so as to ensure that the combined battery packs had enough stored energy to enable the carriage assembly to reach the lower charge point. The second threshold voltage may be quite high to accommodate the variation in cell performance as discussed above. For a loaded lift the current demand moving upwards in certain embodiments is about 20 A; moving down it will be about 2-3 A. The probability of reaching a lower charge point is therefore high.

In certain embodiments the threshold voltage does not take account of the track topology. In certain embodiments the second threshold may be set by an engineer with the necessary interface equipment to alter the stored threshold voltage on the controller board.

Methods embodying the invention may be applied to straight lift, curved lifts, and lifts incorporating both straight and curved sections.

Certain straight lifts use Lead Acid batteries, and like NiCd/NiMh batteries the battery output will just degrade rather than shut down as the batteries do not contain a PCM. Methods embodying the invention may thus be used to monitor the battery voltage in straight stairlifts to prevent the lift stopping halfway up the track.

It will be appreciated that in certain embodiments the PCM will shut down the battery pack when the output voltage falls below a threshold voltage, which may also be described as a trigger voltage. However, the battery voltage is monitored by the stairlift electronics and the circuit can predict the imminent PCM battery shut down as the battery voltage approaches the trigger point. When a potential shut down has been detected the stairlift can prevent chair movements in the upward direction. Instead only downward movements are allowed. A downward movement does not consume appreciable battery charge due to the assistance of gravity and a successful journey to a bottom charging point is likely to be successful. Once on the lower charge point the batteries can be recharged. The stairlift in certain embodiments will not allow the chair to move away from the charging point until the battery has recharged to a sufficient level indicated by a battery voltage significantly above the trigger voltage.

Certain embodiments use two Lithium battery packs, each with its own PCM. The stairlift monitors the voltage of each pack individually to detect which battery pack is about to shut down and hence suspend upward movements.

It will be appreciated that although certain embodiments of the invention have been described with reference to lithium ion batteries, techniques disclosed in this application are also applicable to nickel cadmium and NIMH and indeed other batteries with or without a protection circuit module. At least some of these batteries will just stop working when depleted, rather than being actively shut down. When using such batteries, embodiments of the invention may use a battery output voltage measurement to restrict upward movements when the battery is nearly empty, providing the same user benefits as will be apparent from elsewhere in the specification with reference to systems employing lithium ion batteries with protection circuit modules.

Referring again to FIG. 1, although that figure was described above in relation to an embodiment in which the battery pack 4 was of a type shown in FIG. 2, and comprised a protection circuit module 45, alternative embodiments having the general configuration of FIG. 1 may utilise different battery packs, with or without protection circuit modules 45. Thus, in one such alternative embodiment, the battery, or battery pack, 4 comprises one or more cells coupled between the battery output terminals, but no controllable switching device 46 or protection circuit module 44. The battery module may, in certain embodiments, simply be a battery having output terminals. Thus, in such battery modules there is nothing that would actively shut down the battery or pack in response to a low voltage (e.g. low cell voltage) condition. In embodiments incorporating such batteries or battery packs, the control means is arranged to monitor the output voltage of the battery or battery pack, and use that battery output voltage to determine whether or not to restrict, inhibit, or prevent movement of the carriage assembly under user input, depending on the current conditions or circumstances, as described above in relation to other embodiments. Thus, if the battery output voltage is below a predetermined threshold, then movement in an upward direction may be prevented and/or movement away from a charge point may be prevented, for example.

Figure 13:
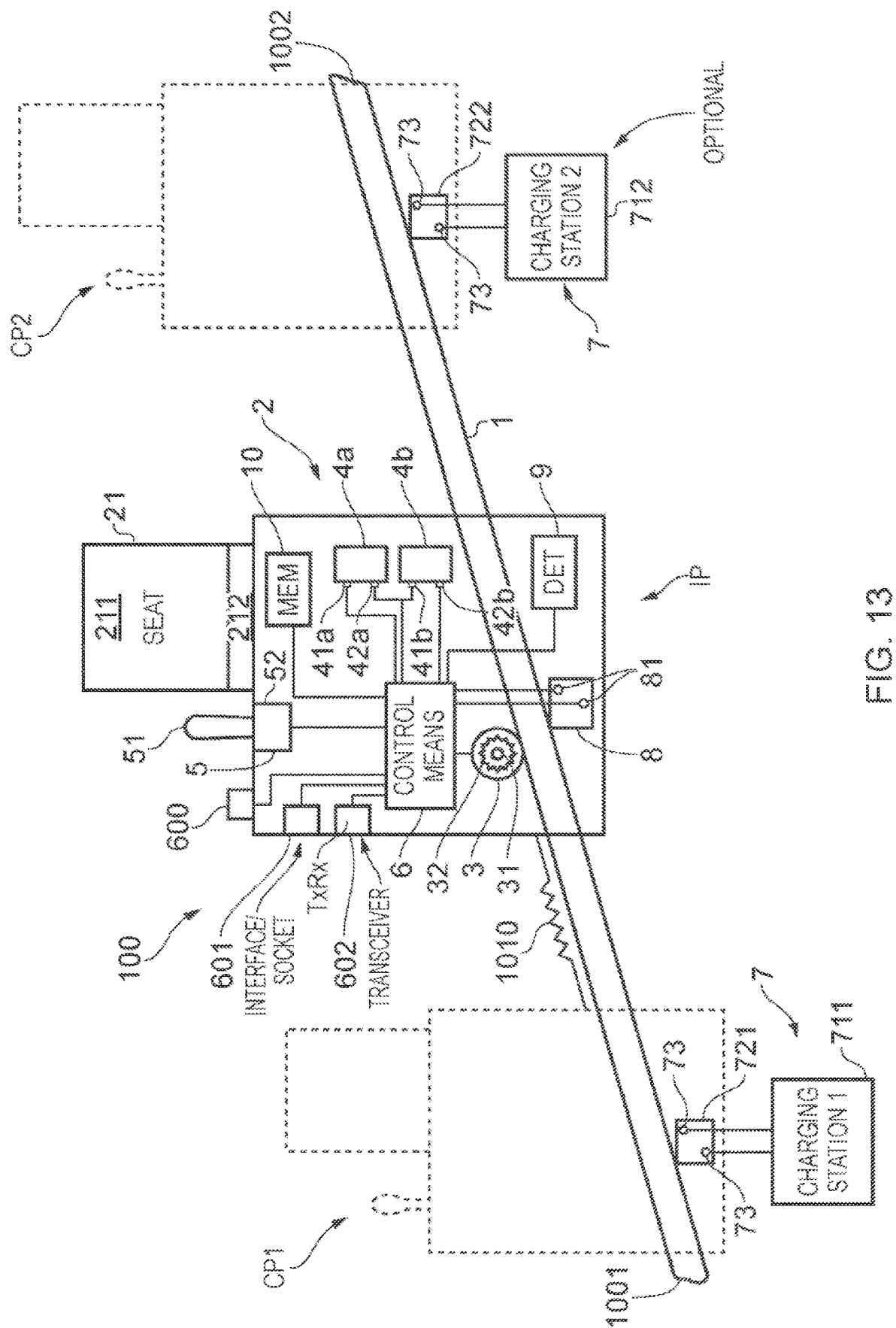
FIG. 13 is a highly schematic representation of another lift system, in the form of a stairlift, embodying an aspect of the invention.

Referring now to FIG. 13, this shows another lift system embodying another aspect of the invention. It has many features and components in common with the system shown in FIG. 1 and described above, and rather than repeating their description the reader is referred to that earlier description. The lift system of FIG. 13 again comprises a rail 1, a carriage assembly 2 comprising a seat or platform for supporting a person to be conveyed along the rail, drive means 3 (module, unit, assembly) arranged to engage the rail and controllable to drive the carriage assembly along the rail, and energy storage means (or module or unit) arranged to power the drive means. In this example the energy storage means comprises first and second batteries or battery packs 4a, 4b, each having a respective pair of first 41a, 41b and second 42a, 42b output terminals, and each having the same technical specification. The two batteries or battery packs are connected in series to provide (under control of the control means) a drive current to the drive means 3. Again the system comprises input means and control means (e.g. at least one controller, control unit, or control module) and charging means (or charging apparatus, charger, charging system) arranged to charge said energy storage means at least when the carriage assembly is at a first charging position CP1 on the rail. The control means is arranged to monitor at least one voltage characteristic of the energy storage means and/or at least one operational characteristic of the stair lift, and generate an alert signal in response to one or more of said characteristics, or a difference between one or more said characteristics, fulfilling a defined criterion, criteria, condition, or conditions. In this example the monitored voltage characteristics include a first voltage across (i.e. between) the terminals 41a, 42a of the first battery and a second voltage across the terminals 41b, 42b of the second battery. Thus, the control means monitors the voltage across each battery, under various conditions, including during and after charging, under zero load, under load, and during recovery after load. The control means may monitor these voltages before, during, and after each journey, and log the data it collects in the memory 10. This monitoring of at least one voltage characteristic of the energy storage means and/or at least one operational characteristic of the stair lift, and generation of an alert signal in response to one or more of said characteristics, or a difference between one or more of said characteristics, fulfilling a defined criterion, criteria, condition, or conditions, may also be employed in embodiments as described above with respect to FIGS. 1 to 12 (i.e. it may be employed in addition to those features relating to prevention of movement away from a charge point to avoid the user being stranded).

In the embodiment of FIG. 13 the carriage assembly further comprises indicating means 600 (e.g. an indicator) operable by the controller to provide the alert signal, or an indication that the alert signal has been generated, to a user of the system. The indicator may provide the alert signal or indication in any suitable form, for example a visual indication, an audible indication, a haptic indication, or any combination of such forms. The user may thus be alerted to a degradation in performance of one or both of the batteries or battery packs, so that she/he may contact a source of assistance before degradation reaches a level at which the user is stranded.

In this embodiment, the carriage assembly further comprises transmitting means in the form of a transceiver 602, by means of which the controller can transmit the alert signal, or an indication that the alert signal has been generated, to a remote location (for example a service or maintenance support centre). An engineer may then be sent out to replace at least one of the batteries/battery packs before failure occurs. The transceiver may also be used to receive signals from remote locations, for use by the control means and/or for providing to the user.

The carriage assembly further comprises an interface 601 by means of which an engineer attending the system may interrogate the control means and memory storing a log of data (for example including the voltage measurements, and one or more alert signals, or data indicative thereof). The interface may be short range wireless, or require physical connection (for example a plug and socket arrangement). By means of the interface 601, a visiting engineer may determine whether an alert signal has been generated, and may also obtain further information regarding the circumstances leading to generation of that alert signal. The engineer may also be provided with an indication of which of the two batteries or battery packs has degraded the most. However, it may generally be preferable to replace both batteries/packs at the same time.

The control means 6 may be arranged to implement one or more of a plurality of battery monitoring techniques to generate an alert signal (i.e. a signal indicative of a fault), as will be described below. One of these techniques is to monitor a difference in voltage or voltage characteristics between the two batteries/packs as, advantageously, both batteries are subject to the same operational conditions, and as one battery/pack will tend to degrade/fail first (rather than both failing together), monitoring that difference (indicative of relative performance) is a reliable and easy way to spot degradation of one battery early, rather than looking at absolute performance indicators.

Figure 14:
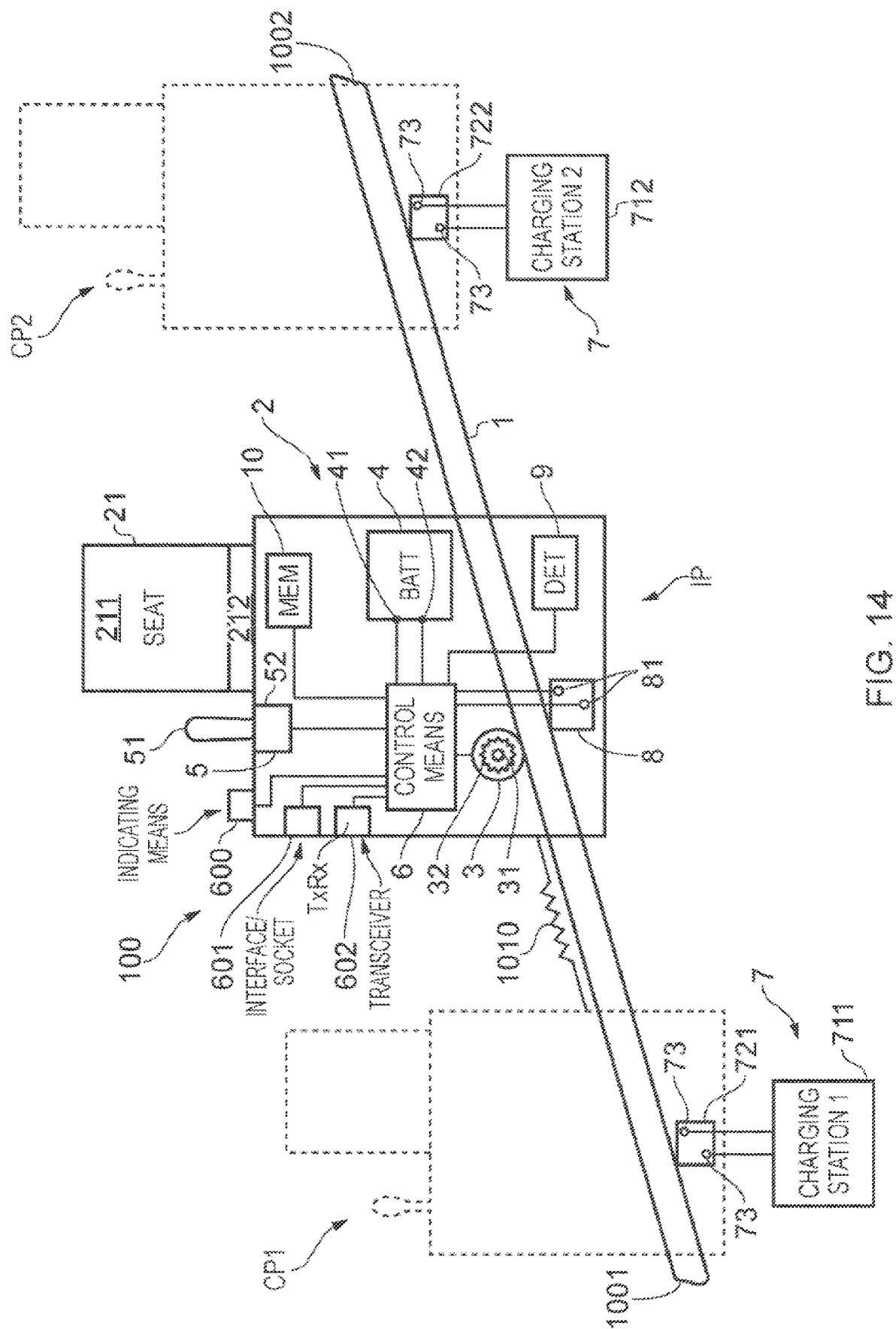
FIG. 14 is a highly schematic representation of yet another lift system, in the form of a stairlift, embodying an aspect of the invention.

In FIG. 14, the control means has separate connections to the terminal 41a, terminal 42b, and the connected terminals 42a, 41b. Thus the control means can monitor the voltages across each battery individually.

Figure 15:
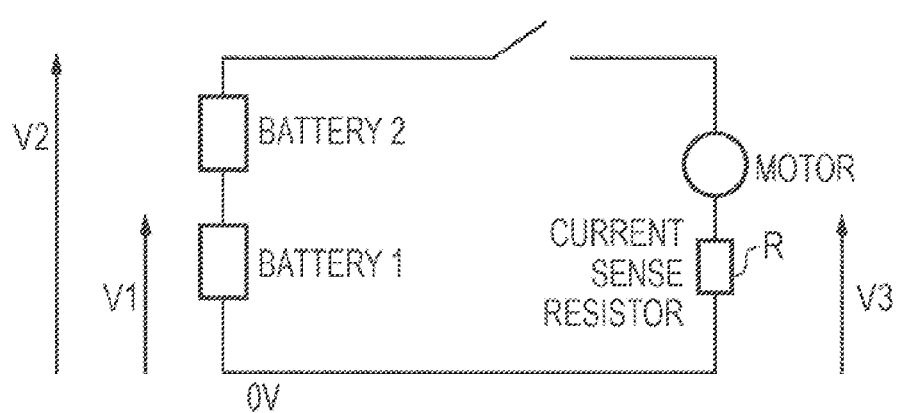
FIG. 15 illustrates voltage and current measurements in certain aspects of the invention for monitoring battery voltage characteristics and lift system operational characteristics.

FIG. 15 is a further illustration of battery measurement techniques in embodiments of the invention, such as that shown in FIG. 13, with energy storage means comprising a plurality of batteries/packs connected in series. FIG. 15 illustrates part of a lift powered by two batteries wired in series. The two batteries power the main motor (i.e. of the drive means). An additional low value resistor R is included to measure the motor current flow. The diagram illustrates the available measurements. The three voltages (V1, V2, V3) are sampled, for example at a rate greater than 1000 samples per second. In certain embodiments groups of samples (e.g. eight samples) are averaged to give an effective new data rate. If the sampling rate is 1000 per second, and eight samples are averaged to produce each new piece of data, then the effective new data rate is greater than 100 readings per second. The conversions (A to D) are performed continuously in certain embodiments. The battery voltage readings may be calibrated during PCB testing resulting in an accuracy of 0.1V and a resolution of 0.02V, for example.

The individual voltages for the two batteries may be determined as follows. V1 is the voltage of battery 1, V2 is the voltage of battery 1 plus battery 2 so the battery 2 voltage is V2 minus V1.

The motor current is proportional to the V3 voltage across the low value current sense resistor. The V3 voltage is amplified before being applied to the A/D converter.

In certain embodiments the two batteries (or battery packs) may be nominally identical, having the same specification, and the system may look for differences in battery characteristics/performance as an indication of degradation. In alternative embodiments, the two batteries may be different, and instead of monitoring differences in characteristics/performance, one or more characteristic of each battery may be monitored against one or more respective criterion or condition.

Referring now to FIG. 14, this illustrates another lift system embodying an aspect of the invention. This embodiment is the same as that shown in FIG. 13, except that now the energy storage means comprises a single battery or battery pack 4, having output terminals 41, 42. The control means is arranged to monitor at least one voltage characteristic (including the voltage across the terminals 41, 42) of the energy storage means and/or at least one operational characteristic of the stair lift (or, more particularly, of its carriage assembly), and generate an alert signal in response to one or more of said characteristics, or a difference between one or more said characteristics, fulfilling a defined criterion, criteria, condition, or conditions. Again, features of the embodiment of FIG. 14 may be employed in embodiments also in accordance with those illustrated in FIGS. 1 to 12. As this embodiment employs just a single battery or battery pack 4, the control means cannot look for differences in voltage characteristics between that battery/pack and another to provide a trigger for generating an alert signal. However, the control means may still employ one or more of a number of the techniques described below, as will be apparent.

Fault Indication

Each of the battery monitoring techniques listed below, which may be employed in embodiments of the present invention utilising one or a plurality of batteries or battery packs, as appropriate, may be used to generate an alert signal (i.e. may result in a signal indication of a fault). The indication in certain embodiments may be presented visually, for example on a 7 segment display of the carriage assembly, or via a message sent to a remote location using wireless or other transmission methods. Additionally, logs within the lift may be maintained to allow a service engineer to access the fault history.

Detection of a Failing Battery

A list of possible failure modes and the method of detection is given below. The list is in no particular order, and embodiments may employ one of these techniques, or a combination of two or more of these techniques, in the generation of alert signals and/or control of movement of the carriage assembly along the rail.

1. Upward Transit Time

If the duration of a journey from the bottom of the track to the top increases over time then a degradation of the battery performance can be detected.

Method: Measure the battery starting voltage, average current and transit time. Discard the readings unless the journey starts with a fully charged battery. The transit time will depend on the weight of the passenger. The technique considers similar average current demands to build a table of results which would group readings for each passenger. If the lift is habitually used by only one or two clients (plus unloaded) the lift can determine which passenger is using the lift and monitor the readings over a large number of movements. If the transit time for a recent group of movements, e.g. the last 50 movements, is substantially longer than the time for an earlier group of movements, e.g. the first 100 movements following initial installation or battery change, then the battery can be flagged for replacement.

2. Upward PWM Monitoring

In certain embodiments the main motor of the drive means is driven from a Pulse Width Modulated signal (PWM). The width of the PWM signal controls the average power applied to the motor and hence the motor output. The system is able to measure the lift speed. A feedback loop can be employed where the PWM drive (width) can be adjusted to maintain the required lift speed. In principle the transit time for a bottom to top journey for certain such embodiments should always be the same as the speed is actively controlled. However as the weight of each passenger varies the motor effort required to maintain the constant speed will also vary. The variation in effort will be represented as an increase in the PWM width for a heavier passenger.

Method: Measure the battery starting voltage. Discard the readings unless the journey starts with a fully charged battery. Monitor the required PWM width to maintain the lift speed over the second fastest track section. As above, the technique must look for similar PWM demands to build a table of results which would group the readings for each passenger. If the PWM width for the same passenger increases over a large number of movements then the batteries are working harder to achieve the required speed and a failing battery can be declared.

3. Time to Charge a Battery

Method: After a succession of lift movements a battery may be presented at the charging point with a voltage more than a certain amount (e.g. 2V) below the normal full charge value. The battery is charged to the full voltage, for example 13.8V for SLA and 15.2V for Lithium. The time taken to charge (e.g. from 11.8 to 13.8V or 13.2 to 15.2V) is measured. A failing battery will take less time than normal to reach 'full' charge. After a number of 'fast' charge cycles the battery can be flagged for replacement.

4. Battery Fails to Reach Full Charge

Method: If a battery fails to reach its nominal full charge voltage (e.g. 13.8V or 15.2V) after a protracted charging period then the battery can be flagged for replacement.

5. Failure to Balance the Battery Voltages

The fully charged voltage of two series connected SLA batteries will tend to balance and settle at the same value providing the charger can provide a high enough charging voltage (e.g. at least 27.6V). Two series connected Lithium battery packs will not naturally balance even with a 30.4V supply and additional active circuitry is required to balance the two Lithium batteries. In either case it should be possible to balance the no load voltage of two serially connected batteries.

Method: If the charging circuit cannot balance the two voltages within a certain amount (e.g. 0.2V) after a protracted charging period then the batteries can be flagged for replacement.

6. Time of Battery Recovery After Full Load

Method: Once a high load has been removed from a battery the battery voltage will recover to a higher voltage (without recharging). The recovery time can be measured. If the rate of recovery decreases over many lift movements the battery can be flagged for replacement.

7. Degradation of Full Battery Charge Voltage

Method: The full battery charge voltage is monitored over many months of service. The full battery voltage will reduce as the batteries age. Once the voltage has consistently fallen below a threshold value the batteries can be flagged for replacement.

8. Upward Movement Safety Stop

Method: During an upward movement the battery voltages are monitored to prevent battery depletion for SLA or PCM shutdown for Lithium. The lift is then restricted to a downward movement in order to reach a charge point. If the batteries started the upward movement with a nominal full charge but repeatedly are unable to complete the journey due to the safety shutdown then the batteries can be flagged for replacement.

9. Comparison of Two Batteries or Battery Packs

The lift utilises two identical batteries connected in series. Each battery should respond to the applied loads and charger cycles in a similar manner. If the two batteries are compared and a different response is detected then a battery can be flagged for replacement. It is unlikely that both batteries will fail at the same time so a direct comparison will highlight a forthcoming failure. An advantage with this technique is both batteries are subjected to the same environmental and usage conditions. If the performance of one battery begins to differ from its partner then the failure is easier to detect when compared to absolute measurement decisions as used in the other methods given above.

Methods: It is assumed the battery set (i.e. combination of batteries connected in series) is fully charged.

A. Compare the battery pack voltages during an upward movement heavy load. If one voltage falls well below the other the lower battery is suspect.

B. Compare the battery pack recovery voltages after a loaded upward movement. If one voltage is well below the other the lower battery is suspect.

C. Compare the battery pack recovery times after a loaded upward movement. If one battery takes much longer than the other the slower battery is suspect.

D. If one battery take much longer than the other battery to fully charge the 'longer' battery is suspect.

E. Item 5. Above is also applicable to this list.

To use the comparison method effectively replacement batteries should always be swapped in pairs and the batteries must have the same specification.

As discussed above in relation to FIGS. 1 to 12, stair lifts may utilise Lithium batteries which can shut down during a passenger movement leaving the client stranded in the middle of the track. This is due to the protection circuit module (PCM) included within each of the two Lithium battery packs. A PCM shut down is necessary to prevent damage to the Lithium batteries. The PCM shut down must be avoided to prevent marooned passengers. In certain embodiments this is achieved by monitoring the individual battery pack voltages during the lift movement. If the voltage approaches the PCM shut down threshold then the lift is stopped and further upward movement of the lift is prevented. Movement in the downward direction is permitted as the demands on the battery are much lower. As a further precaution, the battery voltage may be measured when the passenger initiates a movement request. Hence an upward journey is prevented if it is unlikely to be completed.

The external monitoring of the Lithium battery pack is not always ideal as the only measurement accessible to the lift circuitry may be the nominal 14.8V of the complete battery pack. The Lithium battery is constructed from multiple cells. Internally the PCM monitors the individual cell voltage and shuts down the battery output to prevent excessive discharge or overcurrent when only one of the individual cells falls below the voltage threshold. As the lift circuitry of certain embodiments does not have access to the individual cells the lift could potentially sometimes miss the imminent PCM shut down. Conversely if the lift voltage thresholds are set too high above the PCM thresholds then premature PCM shut down warnings are given preventing the use of the full battery capacity.

A solution to these problems is provided by the following embodiment, described with reference to FIGS. 16, 17, and 18.

The PCM monitors the individual cells to determine when to shut down the output. For example the PCM could be designed to shut down the output if a cell voltage falls below 2.8V. A duplicate of the cell monitoring circuit is added within the battery but configured with a slightly higher threshold voltage of say 3.0V. The additional circuit is arranged to signal an early warning of the imminent PCM shut down allowing the lift to take appropriate action to prevent the real PCM shut down.

Battery Connections

Each battery will now have three connections, the main power and return high current wires, plus an additional low power 'battery good' signal.

The battery pack (4) is constructed from numerous individual cells connected in a series/parallel format.

One, two or more cells (43) are connected in parallel to form a power cell (47) in order to boost the current capacity of the battery pack (4).

One, two or more power cells (47) are connected in series to define the voltage output of the battery pack (4).

The control circuit (45) is arranged to monitor the voltage of the cells (43) in each power pack (47) measuring a voltage V2, V3, V4 . . . Vx.

If the voltage (V2, V3, V4 . . . Vx.) of any cell (43) in any power cell (47) falls below the control circuit (45) threshold (typically 2.8V) then the switching device (46) will disable the battery pack (4) output.

An additional control circuit (48) is arranged to also monitor the voltage of the cells (43) in each power pack (47) measuring a voltage V2, V3, V4 . . . Vx, with a typical shut down threshold of 3.0V. In one example the good battery signal Vg will be V1 when all V2, V3, V4 . . . Vx are above 3.0V or Vg will be 0.0V if any V2, V3, V4 . . . Vx are below 3.0V but above 2.8V.

If the battery pack (4) has entered full shut down because any V2, V3, V4 . . . Vx have fallen below 2.8V the Vg will also be 0.0V as the switching device (46) will be off.

The lift controller monitors the external voltage V1 and the good battery signal Vg.

Battery Good Signal

In certain embodiments two battery packs are wired in series. This presents a problem with the ground (0V) referencing of the battery good output signal from the individual battery packs. One solution is to provide the output using an open drain high side switch configuration. As shown in FIG. 18, the output MOSFET M1 or M2 would be 'on' to indicate 'battery good' and the junction of R1/R2 or R3/R4 would sit at 3.3V.

If the HiPreShutdown detects a cell below 3.0V then M1 is turned off and the junction of R1/R2 falls to 0.0V to indicate a battery bad signal. Similarly for LowPreShutdown.

Figure 16:
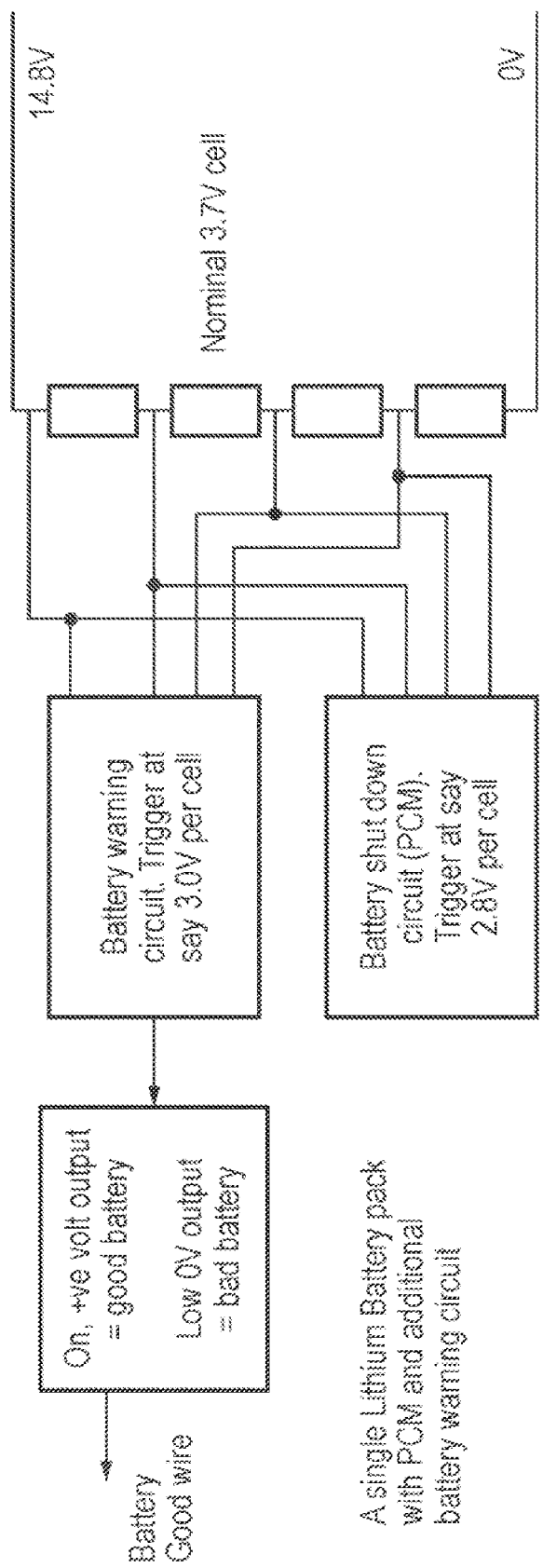
FIG. 16 illustrates a battery pack suitable for use in certain embodiments of the invention.
Figure 17:
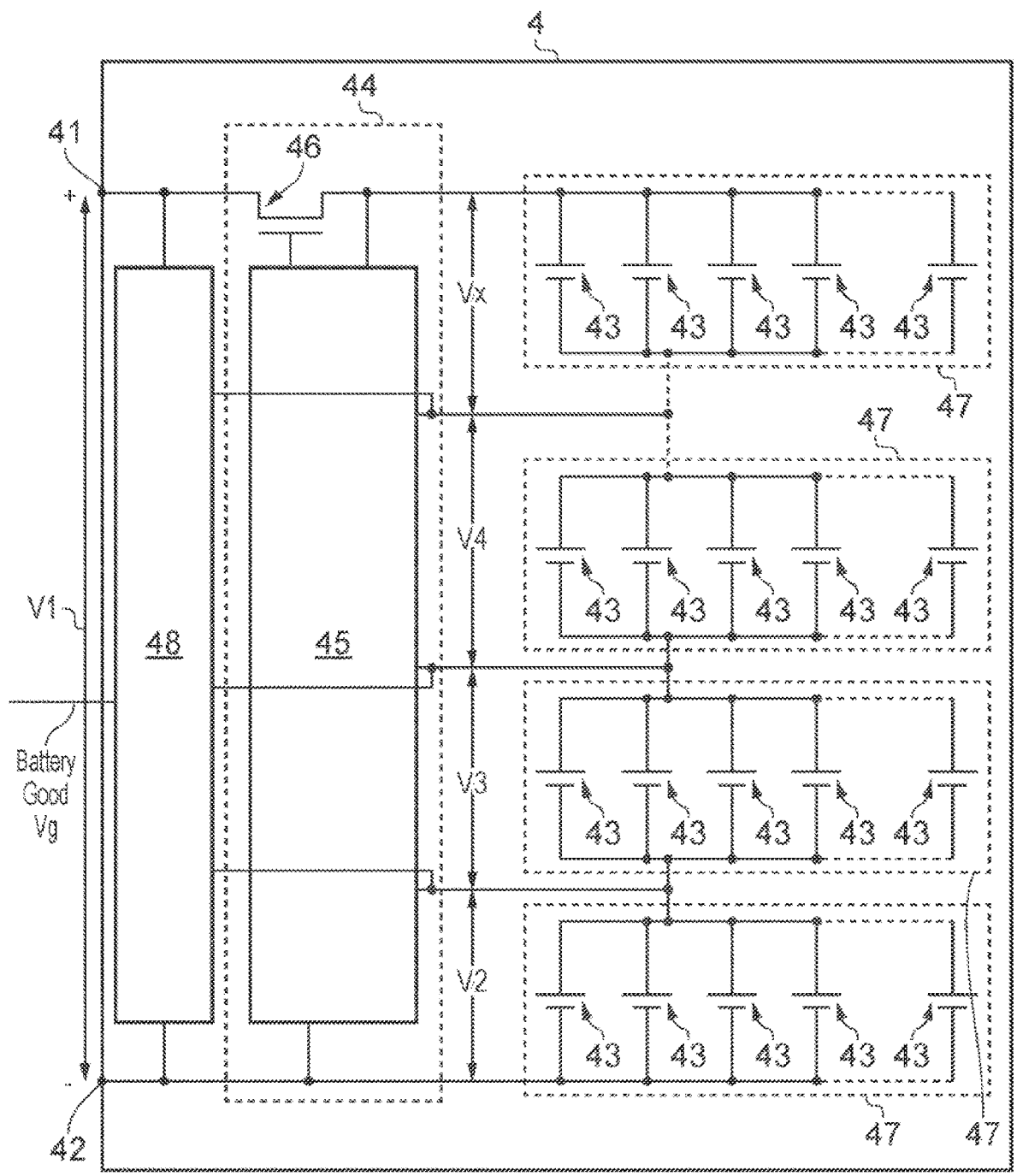
FIG. 17 illustrates a battery pack suitable for use in embodiments of the invention.
Figure 18:
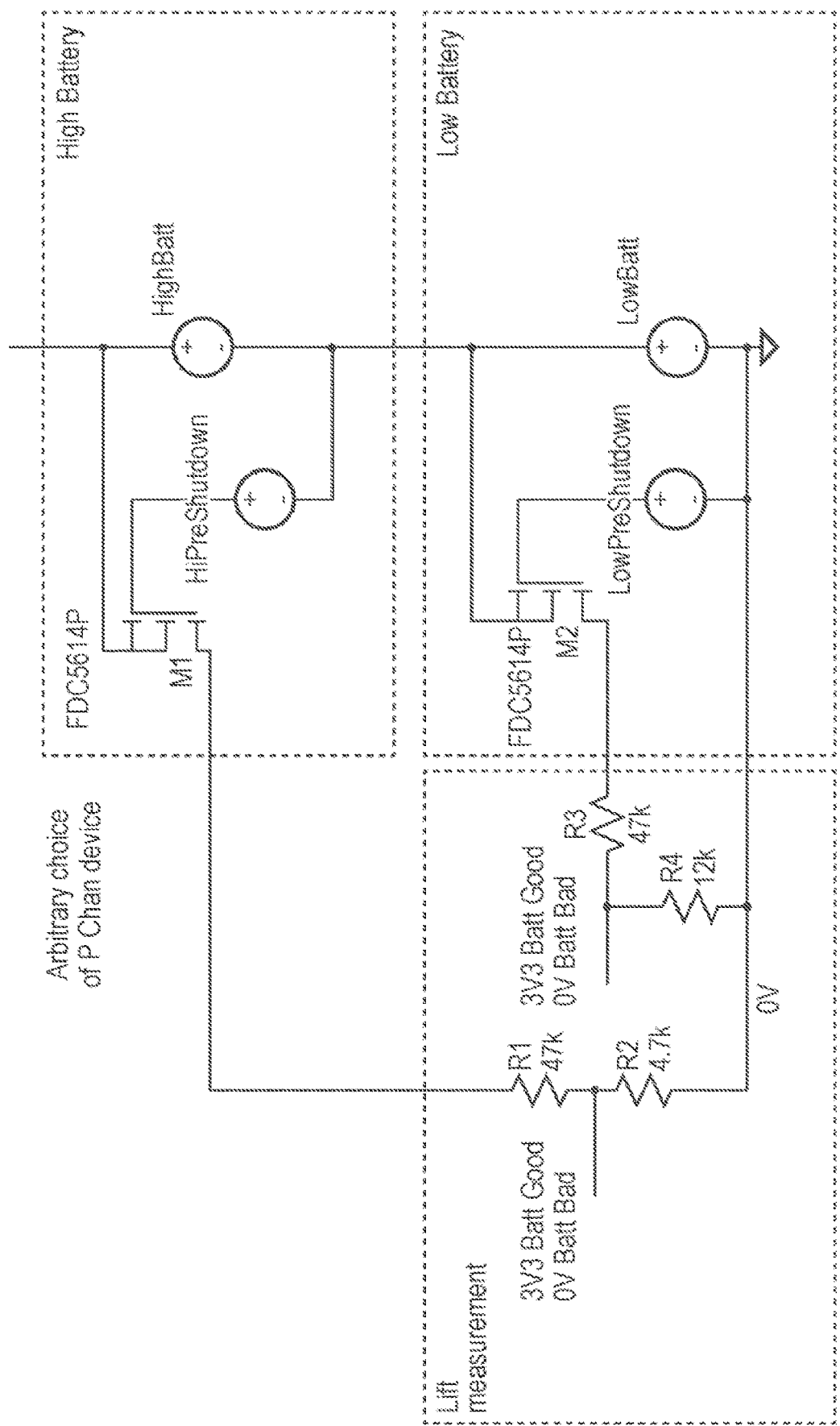
FIG. 18 illustrates circuitry which may be incorporated in embodiments of the invention comprising two batteries or battery packs.

Thus, in certain embodiments employing battery packs and circuitry as illustrated in FIGS. 16 to 18, the output signal Vg provides a warning of the imminent battery PCM shut down and is primarily used to stop the lift. In certain such embodiments the controller may be further arranged to prevent the PCM shut down but enable the passenger to complete the journey, even when a Vg low signal has been detected. In particular, if the lift is travelling at relatively high speed (e.g. its highest speed) when a battery pack, or either battery pack declares Vg low, battery bad, then the lift controller can reduce the power demand by reducing the lift speed. If Vg is still asserted low (bad) at that reduced speed then the lift can be stopped. However, if Vg is now asserted high (good) at the reduced travel speed, then the journey may be completed (i.e. the controller may not intervene to inhibit further upward movement). Thus, reducing the speed may allow the batteries to complete the journey and then recharge (e.g. at the higher charging station) without the PCM shut down.

Thus, another embodiment of the invention provides a lift system generally as shown in FIG. 1 and described above, but incorporating a battery pack as shown in FIG. 16 or FIG. 17, and the operation of the control means is different, as follows. In such an embodiment, the lift system comprises a rail; a carriage assembly comprising a seat or platform for supporting a person to be conveyed along the rail, drive means arranged to engage the rail and controllable to drive the carriage assembly along the rail, at least a first battery pack (or module or unit) arranged to power the drive means, input means operable by a user to provide an input signal indicative of a desired movement of the carriage assembly along the rail, and control means arranged to receive the input signal and control said drive means in response to said input signal. The system further includes charging means 7 arranged to charge the first battery pack 4 when the carriage assembly is at a first charging position on the rail CP1, and optionally when the carriage assembly is at a second charging position on the rail CP2. The first battery pack comprises a first pair of output terminals 41, 42, a first plurality of cells 47, arranged in electrical parallel with each other and coupled to the first pair of output terminals, a first circuit module 45 (e.g. protection circuit module) arranged to monitor a first voltage across the parallel arrangement of the first plurality of cells and prevent further discharge of the first plurality of cells when or if said first voltage falls below a first threshold. The battery pack 4 also comprises a second circuit module 48 arranged to monitor said first voltage and generate an output signal Vg indicative of whether said first voltage is above or below a second threshold, the second threshold being higher than the first threshold. The control means 6 is arranged to receive that output signal (or warning, or battery condition signal) Vg, and, if the output signal indicates that the first voltage is below the second threshold, prevent movement of the carriage assembly along the rail in a direction away from the first charging position, for example towards the second charging position, but allow movement of the carriage assembly along the rail in a direction towards the first charging position when the carriage assembly is located away from the first charging position, for example between the first and second charging positions. Thus, the controller may intervene before the voltage across one cell or group of cells of the battery pack has dropped lower enough to trigger shut down by the first circuit module.

In such a system, the controller may be further arranged, in response to the output signal indicating that said first voltage is below the second threshold while the carriage assembly is travelling along the rail at a first speed, to control the drive means to reduce the speed of travel to a second speed. Then, the controller may be further arranged to monitor the output signal after reducing the speed of travel, and, if the output signal indicates that the first voltage has risen above the second threshold as a result of that speed reduction, allow movement of the carriage assembly away from the first charging position. Alternatively, if the output signal indicates that the first voltage is still below the second threshold after reducing speed, the controller may prevent movement of the carriage assembly away from the first charging position, allowing movement only towards the first charging position.

The invention claimed is:

1. A lift system comprising:
a rail;
a carriage assembly comprising a seat or platform for supporting a person to be conveyed along the rail, drive means arranged to engage the rail and controllable to drive the carriage assembly along the rail, at least a first battery pack arranged to power the drive means, input means operable by a user to provide an input signal indicative of a desired movement of the carriage assembly along the rail, and control means arranged to receive said input signal and control said drive means in response to said input signal; and
charging means arranged to charge said first battery pack when the carriage assembly is at a first charging position on the rail, and when the carriage assembly is at a second charging position on the rail,
wherein the first battery pack comprises a first pair of output terminals, and said control means is arranged to monitor a first output voltage, said first output voltage being a voltage across said first pair of output terminals, and prevent movement of the carriage assembly along the rail in a direction away from the first charging position, towards the second charging position, but allow movement of the carriage assembly along the rail in a direction towards the first charging position when the carriage assembly is located away from the first charging position, between the first and second charging positions, and said first output voltage is below a threshold.

2. A method of operating a lift system comprising a rail, a carriage assembly comprising a seat or platform for supporting a person to be conveyed along the rail, drive means arranged to engage the rail and controllable to drive the carriage assembly along the rail, at least a first battery pack arranged to power the drive means, input means operable by a user to provide an input signal indicative of a desired movement of the carriage assembly along the rail, and control means arranged to receive said input signal and control said drive means in response to said input signal, and charging means arranged to charge said first battery pack when the carriage assembly is at a first charging position on the rail, and when the carriage assembly is at a second charging position on the rail, the method comprising:
monitoring an output voltage of the battery pack and automatically inhibiting movement of the carriage assembly along the rail in a direction away from the first charging position, towards the second charging position, but allow movement of the carriage assembly along the rail in a direction towards the first charging position when the carriage assembly is located away from the first charging position, between the first and second charging positions, and said output voltage is below a threshold.

3. The lift system of claim 1, wherein the second charging position is higher than the first charging position.

4. The method of claim 2, wherein the second charging position is higher than the first charging position.

5. A lift system comprising:
a rail;
a carriage assembly comprising a seat or platform configured to support a person to be conveyed along the rail, a drive configured to engage the rail and controllable to drive the carriage assembly along the rail, at least a first battery pack configured to power the drive, an input device operable by a user to provide an input signal indicative of a desired movement of the carriage assembly up or down along the rail, and a controller configured to receive the input signal and to control the drive in response to the input signal; and
a charger configured to charge the first battery pack when the carriage assembly is at a first charging position on the rail, and when the carriage assembly is at a second charging position on the rail,
wherein the first battery pack comprises a first pair of output terminals, and the controller is configured to monitor a first output voltage, the first output voltage being a voltage across the first pair of output terminals, and to prevent movement of the carriage assembly along the rail in a direction away from the first charging position, towards the second charging position, but allow movement of the carriage assembly along the rail in a direction towards the first charging position when the carriage assembly is located away from the first charging position, between the first and second charging positions, and said first output voltage is below a threshold.

6. The lift system of claim 5, wherein the second charging position is higher than the first charging position.

* * * * *